US012569860B2

(12) United States Patent
Gates

(10) Patent No.: US 12,569,860 B2
(45) Date of Patent: Mar. 10, 2026

(54) SPIRAL SEPARATOR AND APPARATUS THEREFOR

(71) Applicant: OREKINETICS INVESTMENTS PTY LTD, Worongary (AU)

(72) Inventor: Peter Gates, Worongary (AU)

(73) Assignee: OREKINETICS INVESTMENTS PTY LTD, Worongary (AU)

( * ) Notice: Subject to any disclaimer, the term of this patent is extended or adjusted under 35 U.S.C. 154(b) by 0 days.

(21) Appl. No.: 18/041,270

(22) PCT Filed: Aug. 14, 2021

(86) PCT No.: PCT/AU2021/050900
§ 371 (c)(1),
(2) Date: Feb. 10, 2023

(87) PCT Pub. No.: WO2022/036391
PCT Pub. Date: Feb. 24, 2022

(65) Prior Publication Data

US 2024/0024893 A1 Jan. 25, 2024

(30) Foreign Application Priority Data

Aug. 15, 2020 (AU) ................................ 2020902906

(51) Int. Cl.
*B03B 5/62* (2006.01)

(52) U.S. Cl.
CPC .................................... *B03B 5/626* (2013.01)

(58) Field of Classification Search
CPC .... B03B 5/626; B03B 11/00; B03B 2011/002
(Continued)

(56) References Cited

U.S. PATENT DOCUMENTS 2,431,559 A * 11/1947 Humphreys ............ B03B 5/626 209/494
4,189,378 A 2/1980 Wright et al.
(Continued)

FOREIGN PATENT DOCUMENTS

WO 2020163893 A1 8/2020

OTHER PUBLICATIONS

International Search Report and Written Opinion received for PCT/AU2021/050900, mailed Nov. 9, 2021.

*Primary Examiner* — Michael Mccullough
*Assistant Examiner* — Jessica L Burkman
(74) *Attorney, Agent, or Firm* — Greer, Burns & Crain, Ltd

(57) ABSTRACT

An apparatus for a spiral separator, for provision operatively intermediate upstream and downstream spiral trough parts of the spiral separator, including a slurry receiving region for receiving a mineral slurry flow from said upstream spiral trough part of the spiral separator; a splitter for splitting the mineral slurry flow into a concentrate part, a semi-concentrate part and a remainder part; a mixing region for mixing a more fluid radially more outward part of the remainder part with a less fluid radially more inward part of the remainder part, to provide a mixed remainder part for feeding onto the downstream spiral trough part; and a semi-concentrate bypass channel for conveying the semi-concentrate part towards the downstream spiral trough part, such that the semi-concentrate component bypasses and is segregated from the mixing region.

16 Claims, 13 Drawing Sheets

(58) Field of Classification Search
USPC .......................................................... 201/157
See application file for complete search history.

(56) References Cited

U.S. PATENT DOCUMENTS

| | | | | |
|---|---|---|---|---|
| 4,476,980 | A | 10/1984 | Giffard | |
| 4,836,926 | A | 6/1989 | Grobler | |
| 5,535,892 | A * | 7/1996 | Moorhead | B03B 5/626 209/208 |
| 6,264,041 | B1 * | 7/2001 | Niitti | B03B 11/00 209/459 |
| 2007/0075002 | A1 * | 4/2007 | Watters | B03B 9/005 209/711 |
| 2009/0084263 | A1 * | 4/2009 | Obrejanu | E21B 43/38 96/217 |
| 2010/0314327 | A1 * | 12/2010 | Lean | B01D 61/025 210/779 |
| 2019/0345046 | A1 * | 11/2019 | Daloia | C01F 11/462 |

* cited by examiner

SPIRAL SEPARATOR AND APPARATUS THEREFOR

BACKGROUND

The present disclosure relates to spiral separators and especially, but not exclusively to a spiral separators for separating heavy mineral sands from gangue in a mineral slurry. The disclosure extends to parts or components of spiral separators, and to related methods.

Spiral separators are extensively used for the wet gravity separation of particulate solids according to their specific gravity.

A known type of spiral separator comprises one or more helical sluices, often referred to as spirals or spiral troughs, mounted on a central column which is vertical in use. Spiral separators with two or more intertwined helical troughs are known as double- or multiple-start separators. A feed arrangement is provided for feeding a mineral/water slurry to the uppermost part of the, or each, spiral trough. The slurry is induced, by gravity, to flow down the spiral. The particulates in the slurry are subject to a number of different forces, including gravitational force, drag forces due to contact with the spiral, and centrifugal force due to movement along a generally helical path. Broadly speaking, particles with higher specific gravity move toward the radially inner part of the spiral, and particles with lower specific gravity (lower density) move towards the outer parts of the spiral. Suitably distributed off-take openings or channels collect streams of particulates which have undergone this separation.

Two-stage spiral separators provide a more upstream spiral trough part for performing a first stage of separation and a downstream spiral trough part. An off-take opening or channel is provided at the bottom of the more upstream spiral trough part, via which a part of the mineral slurry in which a desired mineral has been concentrated (by separation occurring in the more upstream spiral trough part) is removed from the remainder of the slurry. The remainder of the slurry continues to the downstream spiral trough part, in which further separation occurs. In the downstream trough part, desired mineral distributed in the remainder of the slurry is separated, or concentrated, for example in a radially inner region of the downstream trough part. An off-take opening or channel is provided at the bottom of the more downstream spiral trough part to separate the concentrated desired mineral from the remainder of the slurry.

Third, and possibly one or more subsequent stages may be provided to further separate desired mineral from the unwanted material, or gangue, of the slurry.

An issue with two-stage spiral separators is that by the bottom of the upstream trough part (or first stage) much of the water of the slurry has migrated to the radially outer region of the trough, leaving material in a central region the trough 'dewatered', and with low fluidity. Thus a slow moving central 'slug' of material, consisting largely of gangue, but with some desired mineral entrained therein may be formed. If the slurry flows onto the downstream trough part (or second stage) in this form, separation of the desired mineral from the gangue is inhibited, and separation effectiveness on the downstream trough part is poor.

Steps may therefore be taken to fluidise the central region of the slurry. One approach has been to use a 'repulper' provided on the trough outer wall to deflect water from the radially outer region of the spiral trough into the central slug of material.

The present applicant's earlier patent application, PCT/AU2019/051413, discloses an approach in which the slurry to be fed onto the downstream trough part (or second stage) is thoroughly mixed by a slurry preparation arrangement, and in which the resultant mixed slurry is fed onto the downstream trough part. Further, the kinetic energy of the fast-moving, radially outer, fluid component is intentionally reduced, so that the mixed slurry is fed onto the downstream trough part in a manner similar to that in which slurry is fed by the feed arrangement onto the upstream trough part. This approach is considered to provide improved separation on the downstream trough part compared to the use of one or more repulpers, at least under some circumstances. However, it has been ascertained that there is scope to obtain further benefits over those provided by the slurry preparation arrangement disclosed in PCT/AU2019/051413.

It is an object of the present disclosure to provide an approach which can provide benefits over the use of one or more repulpers and over the use of separators as disclosed in PCT/AU2019/051413, or at least to provide a useful alternative.

Any references to methods, apparatus or documents of the prior art or related art are not to be taken as constituting any evidence or admission that they formed, or form, part of the common general knowledge. Further, it is noted that PCT/AU2019/051413 is not published prior to the earliest claimed priority date of this application.

SUMMARY

According to a first aspect of the present disclosure there is provided an apparatus for a spiral separator, for provision operatively intermediate upstream and downstream spiral trough parts of said spiral separator, the apparatus comprising:

- a slurry receiving region for receiving a mineral slurry flow from said upstream spiral trough part of said spiral separator;
- a first splitting arrangement for splitting a concentrate part of the received mineral slurry flow from a non-concentrate part of the mineral slurry flow;
- a second splitting arrangement for splitting the non-concentrate part of the mineral slurry flow to split a semi-concentrate part of the slurry flow from a remainder part of the slurry flow;
- a mixing arrangement for mixing a more fluid radially more outward part the remainder part with a less fluid radially more inward part of the remainder part, for feeding the mixed remainder part onto the downstream spiral trough part; and
- a semi-concentrate bypass channel for conveying the semi-concentrate part towards the downstream spiral trough part, so that the semi-concentrate part can be fed onto the downstream spiral trough part, wherein the semi-concentrate bypass channel is configured so that the semi-concentrate component bypasses the mixing arrangement.

The apparatus may be a modular unit for inclusion in a spiral separator.

The apparatus may be an integral part of a spiral separator.

In an embodiment at least one of the first and second splitting arrangements comprises an adjustable splitter member, for allowing adjustment of a split.

In an embodiment at least one of the first and second splitting arrangements comprises a slideable splitter member.

In an embodiment at least one of the first and second splitting arrangements comprises a rotatable splitter member.

In an embodiment the first splitting arrangement comprises an adjustable splitter member, for allowing adjustment of a split, and the second splitting arrangement comprises a fixed splitting arrangement.

In an embodiment the apparatus comprises a semi-concentrate feed arrangement for feeding the semi-concentrate part onto said downstream spiral trough part.

In an embodiment the semi-concentrate feed arrangement comprises an outlet opening of the semi-concentrate bypass channel.

In an embodiment the apparatus comprises a remainder feed arrangement for feeding the mixed remainder part onto said downstream spiral trough part.

In an embodiment the remainder feed arrangement comprises an outlet opening of the mixing arrangement.

In an embodiment the semi-concentrate feed arrangement is adapted to feed the semi-concentrate part onto a radially inner region said downstream spiral trough part.

In an embodiment the remainder feed arrangement is adapted to feed at least most of the mixed remainder part onto a region of said downstream spiral trough part which is relatively far from an axis of the downstream spiral trough part, and the semi-concentrate feed arrangement is adapted to feed the semi-concentrate part onto a region of said downstream spiral trough which is relatively close to an axis of the downstream spiral trough part.

In an embodiment the apparatus comprises a wash water director to direct wash water from the remainder part of the slurry flow into the semi-concentrate part of the slurry flow on the downstream spiral trough part.

In an embodiment the semi-concentrate part is a part of the slurry flow which is radially closer to the first splitting arrangement and the remainder part is a part of the slurry flow which is radially further from the first splitting arrangement.

In an embodiment the mineral slurry comprises desired mineral and gangue.

In an embodiment the concentrate part comprises a higher proportion of desired mineral to gangue than the semi-concentrate part.

In an embodiment the semi-concentrate part comprises a higher proportion of desired mineral to gangue than the remainder part.

In an embodiment the semi-concentrate bypass channel is segregated from a mixing region of the mixing arrangement.

In an embodiment the apparatus comprises at least one wall part between the semi-concentrate bypass channel and a mixing region of the mixing arrangement.

In an embodiment the apparatus provides a concentrate channel for receiving the concentrate part of the mineral slurry flow and segregating said concentrate part from the non-concentrate part of the mineral slurry flow.

In an embodiment the concentrate channel is configured to direct at least part of the concentrate part to a concentrate gutter.

In an embodiment the concentrate channel is configured to direct at least part of the concentrate part to an interior of a central column of the spiral separator.

In an embodiment the apparatus comprises a further splitting arrangement for splitting a higher grade part of the concentrate part from a lower grade part of the concentrate part.

In an embodiment the apparatus comprises a first concentrate channel for the higher grade part of the concentrate part and a second concentrate channel for the lower grade part of the concentrate part.

In an embodiment the mixing arrangement comprises a trough floor part to receive the less fluid part of the remainder part.

In an embodiment, the mixing arrangement comprises a passageway for passage of the more fluid part of the remainder part therethrough.

In an embodiment the passageway has a passageway outlet opening.

In an embodiment the mixing arrangement is configured so that in use the passageway outlet opening is provided above the trough floor part, to allow the more fluid part of the remainder part to drop onto the less fluid part of the remainder part.

In an embodiment the mixing arrangement comprises an energy dissipation region to reduce kinetic energy of the more fluid part the remainder part before the mixed remainder part exits mixing arrangement.

In an embodiment the energy dissipation region comprises one or more baffles adapted to reduce kinetic energy of the more fluid part the remainder part.

In an embodiment the energy dissipation region comprises a passageway for passage of the more fluid part of the remainder part therethrough the passageway having a convoluted path.

According to a second aspect of the present disclosure there is provided an apparatus for a spiral separator, for provision operatively intermediate upstream and downstream spiral trough parts of said spiral separator, the apparatus comprising:

- a slurry receiving region for receiving a mineral slurry flow from said upstream spiral trough part of said spiral separator;
- a splitting arrangement for splitting the mineral slurry flow into a concentrate part, a semi-concentrate part and a remainder part;
- a mixing arrangement for mixing a more fluid radially more outward part of the remainder part with a less fluid radially more inward part of the remainder part, to provide a mixed remainder part for feeding onto the downstream spiral trough part; and
- a semi-concentrate bypass channel for conveying the semi-concentrate part towards the downstream spiral trough part, such that the semi-concentrate component bypasses and is segregated from the mixing arrangement.

In an embodiment the splitting arrangement comprises: a first splitting arrangement for splitting a concentrate part of the received mineral slurry flow from a non-concentrate part of the mineral slurry flow; and a second splitting arrangement for splitting the non-concentrate part of the mineral slurry flow to split a semi-concentrate part of the slurry flow from a remainder part of the slurry flow.

According to third aspect of the present disclosure there is provided a spiral separator comprising:

- a first spiral trough part;
- a second spiral trough part, downstream of the first spiral trough part; and
- an apparatus in accordance with either of the first and second aspects, provided downstream of the first spiral trough part and upstream of the second spiral trough part.

According to a further aspect of the present disclosure there is provided a method of concentrating a desired mineral provided in a mineral slurry comprising the mineral, gangue and water, the method comprising:

using an upstream stage of a spiral separator to concentrate the desired mineral towards a radially inner side of a spiral trough of the upstream stage, splitting the slurry, at or adjacent a bottom region of the upstream stage, into a concentrate part, a semi-concentrate part and a remainder part, wherein the concentrate part comprises a higher proportion of desired mineral to gangue than the semi-concentrate part, and the semi-concentrate part comprises a higher proportion of desired mineral to gangue than the remainder part, segregating the semi-concentrate part from the remainder part;

mixing a more fluid radially more outward part the remainder part with a less fluid radially more inward part of the remainder part, in a mixing region of the spiral separator to thereby provide a mixed remainder part, wherein the semi-concentrate part is segregated from the mixing region; and feeding the mixed remainder part and the semi concentrate part onto a downstream stage of the spiral separator.

In an embodiment the semi-concentrate part flows through a bypass channel, which bypasses the mixing region.

In an embodiment the feeding of the mixed remainder part and the semi concentrate part onto said downstream stage of the spiral separator comprises feeding the semi-concentrate part onto a radially more inward region of a spiral trough of the downstream stage, and feeding the mixed remainder part onto a radially more outward region of the spiral trough of the downstream stage.

It should be appreciated that features and/or characteristics of any of the above aspects or embodiments thereof may be incorporated into any of the other aspects.

BRIEF DESCRIPTION OF THE DRAWINGS

Embodiments in accordance with the present disclosure will be described, by way of example, in the following Detailed Description of Embodiments which provides sufficient information for those skilled in the art to perform the invention. The Detailed Description of Embodiments is not to be regarded as limiting the scope of the preceding Summary section in any way. The Detailed Description will make reference to the accompanying drawings, by way of example, in which:

FIG. 8(*a*) corresponds to FIG. 8 but shows the lid in an in-use position;

FIG. 11(*a*) is a schematic plan view corresponding to that of FIG. 11, but illustrating an embodiment with some differences to the embodiment of FIGS. 7 to 11;

FIG. 11(*b*) is a schematic vertical side elevation of an adjustable splitter blade of FIG. 11(*a*);

DETAILED DESCRIPTION

Figure 1:
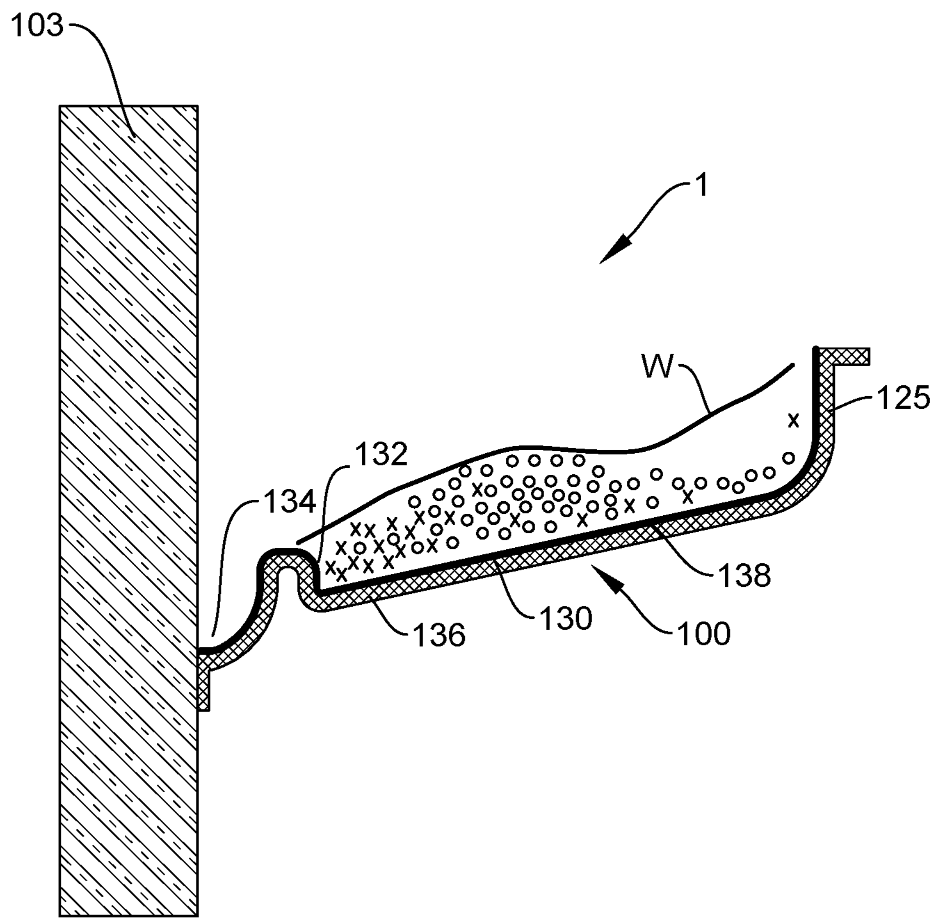
FIG. 1 is a schematic cross sectional view of a mineral slurry on a spiral separator trough, which provides a qualitative illustration of the relative distributions of desired mineral and gangue across the width of the trough.

With reference to the accompanying drawings embodiments of an apparatus in accordance with the present disclosure will now be described.

As mentioned in the background section above, the present applicant's earlier patent application, PCT/AU2019/051413, discloses an approach to providing slurry onto a downstream trough part (or second stage) of a spiral separator, after some desired mineral has been separated out as a concentrate subsequent to separation occurring on an upstream trough part. In the approach described in PCT/AU2019/051413, the slurry to be fed onto the downstream trough part is thoroughly mixed by a slurry preparation arrangement, and the resultant mixed slurry is fed onto the downstream trough part. Further, the kinetic energy of the fast-moving, radially outer, fluid component is intentionally reduced, so that the mixed slurry is fed onto the downstream trough part in a manner similar to that in which slurry is fed by a known feed arrangement onto the upstream trough part (or first stage). This approach is considered to provide improved separation on a downstream trough part compared to the use of one or more repulpers, at least under some circumstances.

However, it has been found during comparative testing that under some conditions the use of one or more repulpers to fluidise the dewatered part of the slurry flow can yield better separation on the downstream trough part than use of the slurry preparation arrangement disclosed in PCT/AU2019/051413. In particular, when a relatively high percentage of available heavy mineral is split from the rest of the slurry at the bottom of the upstream trough part (for example, the first stage of the separator), the slurry preparation arrangement disclosed in PCT/AU2019/051413, can yield better separation on the downstream trough part than the use of one or more repulpers. However, when a relatively low percentage of available heavy mineral is split from the rest of the slurry at the bottom of the upstream trough par, the use of one or more repulpers can yield better separation on the downstream trough part than the slurry preparation arrangement disclosed in PCT/AU2019/051413.

Analysis of these findings suggests that the better separation on the downstream stage provided by the repulper approach (under the applicable circumstances set out above) is at least in part due to there being a region of the slurry, which tracks close to the splitter at the bottom of the upstream trough part but which is not split from the rest of the slurry as concentrate, and which contains a substantially higher concentration of desired mineral than the rest of the slurry which is fed onto the downstream trough part. This may, for convenience, be considered a 'near miss' or 'semi-concentrated' part of the slurry flow. For a mineral with a higher specific gravity than the gangue, this region is adjacent, but radially outwards of the splitter, which is positioned close to the radially central part of the separator. The semi-concentrated part of the slurry flow is therefore quite close to the radially inner part of the upstream trough part at the downstream end of the upstream trough part. The repulper approach does not substantially focus on thoroughly mixing all remaining components of the slurry, and may therefore leave a substantial amount of the desired mineral in the semi-concentrate part of the slurry in a radially inwards position. Accordingly, a substantial amount of the desired mineral from the semi-concentrated part of the slurry flow enters the downstream trough part close to the radially inner part of downstream trough part. Separation on the downstream trough part (or second stage) of the separator relies on migration of desired mineral towards the radially inner part of the downstream trough part. Thus the repulper approach, in leaving a significant amount of the desired mineral in a radially inwards position, may be regarded as providing slurry onto the downstream stage in an already partially separated state.

By way of illustration, FIG. 1 illustrates schematically and qualitatively an example of the distribution of desired heavy mineral, represented by the character 'X' and gangue, represented by the character 'O' in a mineral slurry across a radial cross section of a trough 100 of a spiral separator 1, for example at the bottom of a first stage, but before mineral concentrate has been removed. The line designated by the character 'W' schematically indicates a level of the top of the slurry, which may be a water height, to provide an indication of water content across the trough 100.

In the illustration of FIG. 1 the trough 100 is supported by a central column 103, and has trough floor 130, with a profile which is substantially straight and which extends across most of the radius of the trough 100. The trough floor 130 is provided between, and bounded by, an upstanding outer wall 125 of the trough 100 on the radially outer side of the trough floor 130, and an upstanding inner wall part 132 of the trough 100 on the radially inner side of the trough floor 130. In the illustrated embodiment the upstanding inner wall part 132 of the trough 100, provides a barrier between the trough floor 130, and a radially inner concentrate gutter 134, which may be used (particularly in second or subsequent stages of the spiral separator) to convey concentrate which has been separated from the rest of the slurry, quarantined away from the slurry which is still subject to the separation process on the spiral. The trough floor 100 may comprise a main structural part 136, for example of glass-fibre reinforced polymer, and a protective liner 138 which forms the trough floor 130 and protects the main structural part 136 from abrasion.

Turning now to the distribution of desired heavy mineral, X, and gangue, O, across the radial cross section of the trough 100, there is a high concentration of desired heavy mineral X at the radially inner region of the trough 100, and a much lower concentration of heavy mineral in the radially outer and radially central regions of the trough 100. However, the separation is not perfect, and there is some heavy mineral X in the radially outer and radially central regions of the trough 100, and some gangue at the radially inner region of the trough 100. Further, although discussion of spiral separators may involve reference to different 'bands' within the slurry flow, to the extent that such bands exist their boundaries are not discrete, but rather there is a varying proportion of heavy mineral to gangue in the radial direction of the trough. This makes setting the radial point at which a split is taken a matter of discretion, rather than a matter of pinpointing an exact radial location of a boundary between high grade and low grade bands. Broadly speaking, taking a split at a more outward radial location will result in taking off more of the desired heavy mineral, and a higher percentage of the heavy mineral in the slurry, but at lower grade (that is, a lower proportion of desired heavy mineral to gangue), whereas taking a split at a more inward radial location will provide a higher grade (that is, a higher ratio of desired heavy mineral to gangue) result in taking off less of the desired heavy mineral, and a lower percentage of the heavy mineral in the slurry as a whole. Thus, deciding on a splitter setting may be considered to be making a compromise, taking into account factors such as the desired grade of material of the final product, and the further processing that is available and practicable.

Thus, while the approach taken in PCT/AU2019/051413 can provide better separation on the subsequent stage than the use of repulpers when a relatively high percentage of available heavy mineral is split from the rest of the slurry at the bottom of the upstream stage, this may not be what is required in a particular set-up.

Figure 2:
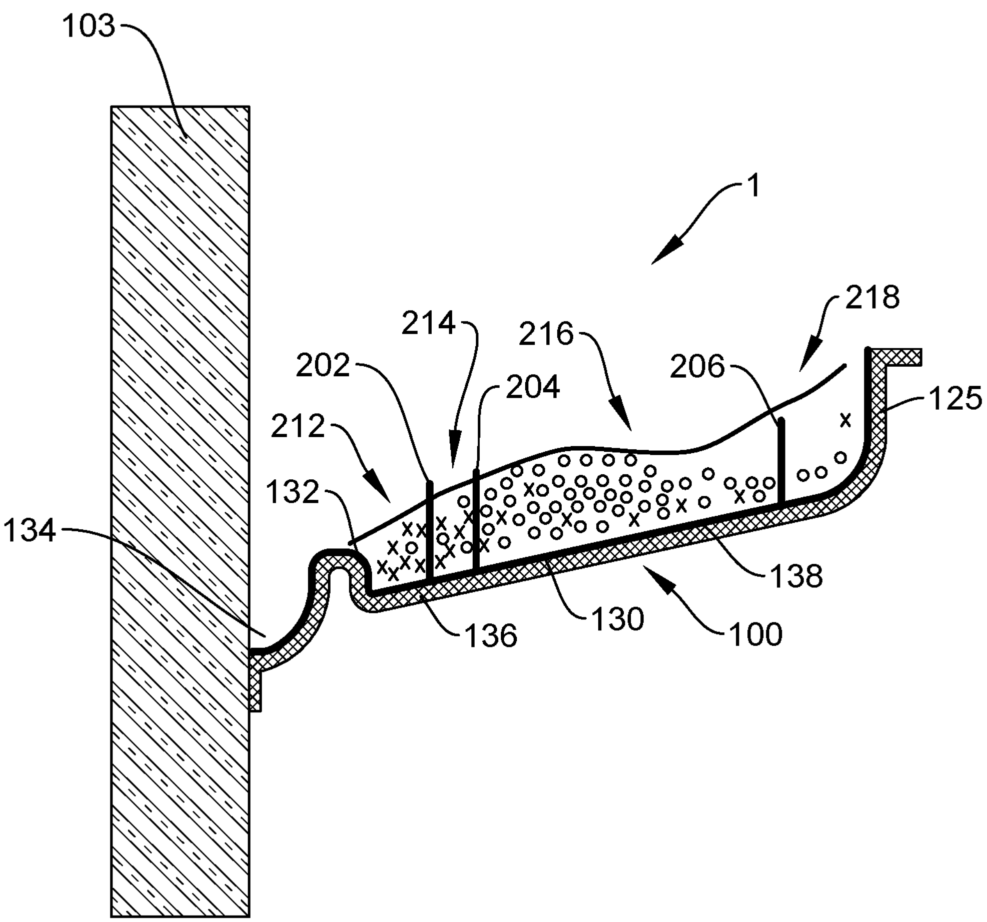
FIG. 2 is a schematic cross sectional view similar to that of FIG. 1, but further illustrating positions across the width of the trough at which it may be desirable to divide or split the slurry.

FIG. 2 illustrates substantially the distribution of slurry illustrated in FIG. 1, split into four components by first to third vertical lines 202, 204, 206 spaced apart in the radial direction of the trough. A component of the slurry between the first vertical line 202 (which is the most radially inward line) and the upstanding inner wall part 132 of the trough 100 is the most radially inward component of the slurry, and may be regarded as a concentrate component 212. A component of the slurry between the first vertical line 202 and the second vertical line 204 (which is the second most radially inward line), 100 is the second most radially inward component of the slurry, and may be regarded as a semi-concentrate component 214. The component of the slurry between the second vertical line 204 and the third vertical line 202 (which is the most radially outward line), is a radially intermediate component 216 of the slurry and has relatively low water content and fluidity. The component of the slurry between the third vertical line 202 and the upstanding outer wall 125 of the trough 100 is the most radially outward component 218, and has high water content and fluidity.

It should be appreciated that FIGS. 1 and 2 are intended to be illustrative only, and to provide a qualitative illustration of the slurry distribution across the trough, rather than to provide quantitative information. However, it is noted that in analysing the heavy mineral grade gradient radially across a spiral trough surface at the bottom of a first stage, it has been observed that heavy mineral grades close to the centre column are typically very high, reducing, in a non-linear manner to very low levels in the outer parts (tailings area) of the trough profile. By way of more qualitative example, it has been observed that in spiral gravity separation using a 3-5% heavy mineral feed slurry, the non-linear gradient commonly results in grades of over 60 to 70% heavy mineral close to the centre column and lower than 1% in the radially outer (tails) area.

It should also be appreciated that FIGS. 1 and 2 are not to scale (for example, the cross trough slope of the floor is exaggerated, and the height of the slurry and level of the water are exaggerated for illustrative purposes).

Figure 3:
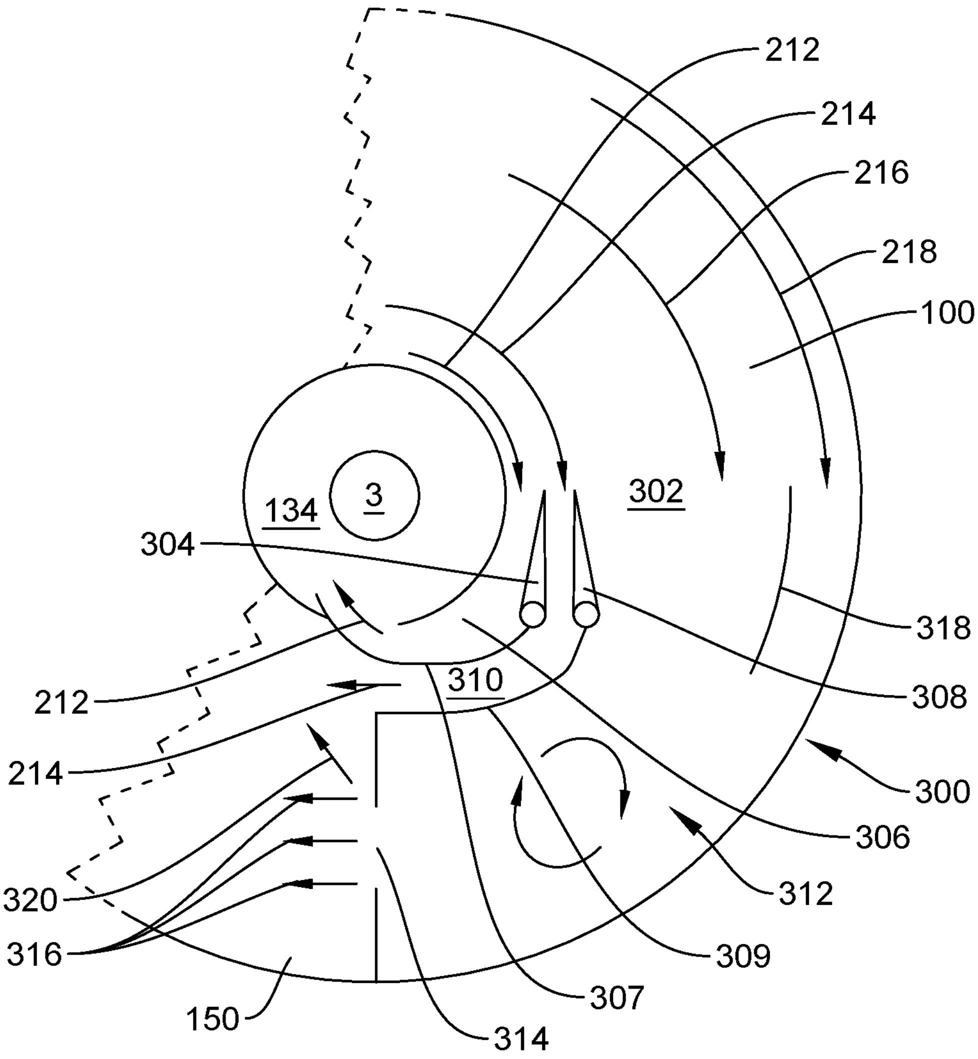
FIG. 3 is a schematic plan view illustrating an embodiment of an apparatus in accordance with the present disclosure.

FIG. 3 illustrates schematically, in plan view, an indicative structure for an embodiment of an apparatus, generally designated by the reference numeral 300, in accordance with the present disclosure. FIG. 3, and the following description thereof, is intended primarily to provide a broad indicative overview that relates the structure of an apparatus in accordance with the present disclosure to the concentrate component 212, semi-concentrate component 214, less fluid radially intermediate component 216, and more fluid most radially outward component 218 of the slurry as discussed above and illustrated in FIG. 2. (A further embodiment will be described in due course, with particular reference to FIGS. 7 to 11 and, despite differences, the description thereof may also augment the reader's understanding of the embodiment of FIG. 3.)

The apparatus 300 is, in use, provided operatively intermediate an upstream spiral trough part 100 and a downstream spiral trough part 150 of a spiral separator.

The apparatus 300 comprises a slurry receiving region, in the form of a slurry entry region 302, at an upstream part thereof for entry of slurry exiting the trough 100.

The apparatus 300 comprises a first splitting arrangement in the form of a first splitter 304, for splitting a concentrate part of the slurry flow from the rest of the slurry flow (which may be regarded as a non-concentrate part of the slurry flow). The first splitter 304 may be arranged to take a split at a radial location corresponding to the position of the first line 202 illustrated in FIG. 2, so as to split a concentrate part corresponding to concentrate component 212 as illustrated in FIG. 2, of the received mineral slurry flow from the rest of the mineral slurry flow. The concentrate component 212 of the slurry flow may then be directed by a concentrate channel 306, to an offtake, such that it is not subject to further concentration or losses into less concentrated parts of the slurry in subsequent stages of the spiral separator. For example, the concentrate component 212 may be directed into the radially inner concentrate gutter 134 (as illustrated in FIG. 3) or may be directed into an offtake arrangement provided in the central column 3.

The apparatus 300 further comprises a second splitting arrangement, in the form of a second splitter 308, for splitting the non-concentrate part of the mineral slurry flow to split a semi-concentrate part of the slurry flow from a remainder part of the slurry flow. The second splitter 308 may be arranged to take a split at a radial location corresponding to the position of the second line 204 illustrated in FIG. 2, so as to split a semi-concentrate part corresponding to semi-concentrate component 214, as illustrated in FIG. 2, of the received mineral slurry flow from the remainder part of the mineral slurry flow. In the illustrated embodiment the remainder part of the slurry flow comprises the radially intermediate component 216 of the slurry flow (which has relatively low water content and fluidity) and the most radially outward component 218 of the slurry flow (which has relatively high water content and fluidity).

The semi-concentrate component 214 of the slurry flow may then be directed by a semi-concentrate channel 310 onto the downstream spiral trough part 150 (for example the second stage) of the spiral separator. In particular, the semi-concentrate component 214 of the slurry flow may be directed by the semi-concentrate channel 310 onto a radially inner part of the downstream spiral trough part 150.

The first and second splitters 304, 308 may be adjustable, so that the splits taken as the concentrate and semi-concentrate parts (or components) can be adjusted as desired and appropriate. In the illustrated embodiment 300 the first and second splitters 304, 308 are rotational splitters, but other types of splitter may be used.

Providing adjustability of the first splitter is highly advantageous, in order to allow off-take of a concentrate fraction which has characteristics (for example, grade and/or quantity) as close as practicably possible to desired characteristics. The characteristics of the concentrate are sensitive to the radial position of the split. Desired characteristics of the concentrate may vary over time, for example due to variation in desired final product and/or changes in availability, desirability and/or type of further processing that may be applied to the concentrate. Further, operating conditions of a spiral separator, such as percentage of desired mineral or other characteristics of the feed slurry, may change over time. (The foregoing is intended to be an illustrative, rather than exhaustive, discussion of why adjustability of the first splitter is desirable.) It is anticipated that the overall performance of a spiral separator will be substantially less sensitive to the exact position of the second splitter. That is, the separator performance is not anticipated to rely heavily on provision of a precise semi-concentrate split (although separator performance is anticipated to be adversely affected if an excessively small or excessively large semi-concentrate split is provided.) The size of the semi-concentrate part may therefore not need to be adjusted overtime, and if it does vary slightly over time (for example due to changes in operating conditions) compensatory adjustment may not be required. Accordingly, the facility to adjust the second splitter may not be required. It may therefore be desirable for the second splitter to be fixed in position rather than adjustable. For example, the second splitter may be fixed device or configuration provided to take a split at in a predetermined radial location. One option is to provide a non-adjustable second splitter during manufacture, in the same position in each apparatus. Another option is to provide a non-adjustable second splitter in a position tailored for the anticipated use of the apparatus, but which position is not susceptible to subsequent adjustment.

It should be appreciated that although the various components or parts of the slurry flow (for example 212, 214, 218, 218) are, for the purpose of this description, regarded as existing before they are split, the boundaries of these parts are determined by the positions and settings of the splitters. Further it should be appreciated that the terms 'part' and 'component' (and their plurals) used in relation to parts of the slurry flow are used interchangeably (unless context determines otherwise), and may also be regarded as 'streams', 'bands' or 'fractions' of the slurry flow.

The apparatus 300 further comprises a mixing arrangement 312 for mixing the most radially outward component 218 with the radially intermediate component 216 of the slurry flow. The mixing arrangement has an outlet opening 314 for feeding the mixed remainder part 316 onto the downstream spiral trough part 150 (for example the second stage) of the spiral separator.

The mixing arrangement 312 is intended to thoroughly mix the components 216, 218, of the remainder part to provide a mixed remainder part 316 which has good fluidity and particle mobility and can be effectively processed on the downstream spiral trough part 150. Any suitable mixing arrangement can be used, and PCT/AU2019/051413, the disclosure of which is incorporated herein by reference, discloses a number of alternative mixing arrangements.

As disclosed in PCT/AU2019/051413, it is also desirable to dissipate kinetic energy of the most radially outward component 218 of the slurry flow (which has relatively high water content and fluidity, and high velocity at the bottom of a separation stage).

In an embodiment the more fluid radially more outward part 218 of the remainder part of the flow is separated from the less fluid radially more inward part 216 of the remainder part before mixing them together. A separation configuration 318 is schematically illustrated in FIG. 3, and may for example comprise a ramp arrangement and/or passageway which guides the more fluid radially more outward part 218 of the remainder part to elevate it relative to the less fluid radially more inward part 216 of the remainder part (as described in PCT/AU2019/051413). The separation configuration may effectively separate the more fluid radially more outward part of the remainder part of the flow from the less fluid radially more inward part of the remainder part at a radial position corresponding to the position of the third vertical line 206 in FIG. 2.

Separating the more fluid radially more outward part the remainder part 218 from the less fluid radially more inward part 216 of the remainder part before mixing them together is considered advantageous because it allows kinetic energy of the high velocity more fluid radially more outward part 218 of the fluid flow to be dissipated before mixing. The less fluid radially more inward part 216 of the remainder part may be slow moving and may be prone to stalling or sanding if kinetic energy thereof is substantially reduced or dissipated prior to mixing with the more fluid radially more outward part the remainder part.

It will be appreciated that the semi-concentrate channel 310 conveys the semi-concentrate part 214 to the downstream spiral trough part 150, while keeping the semi-concentrate part separate to the remainder part of the slurry flow. In the illustrated embodiment the semi-concentrate channel 310 is bounded at a radially inner side thereof by an inner wall 307, and at a radially outer side thereof by an outer wall 309, which separates the semi-concentrate channel 310 from the mixing arrangement 312. The semi-concentrate component is not mixed with the remainder part of the slurry before it is fed onto the downstream spiral trough part. Thus the semi-concentrate channel 310 comprises a bypass channel which is configured so that the semi-concentrate component bypasses the mixing arrangement.

The semi-concentrate part may be low in water content (since it is collected from near the radially inner part of the trough) so that it may be desirable to enhance mobility in the particulates thereof by introducing wash water 320, for example deflected from the outlet opening 314, onto or into the semi-concentrate part.

Feeding the semi-concentrate part 214 onto a radially inner part of the downstream spiral trough part 150, without having mixed the semi-concentrate part 214 with the remainder part, provides a significant amount of the desired mineral in a radially inner position of the downstream spiral trough part 150 at the beginning or top of the downstream spiral trough part 150.

Thus the described approach is considered to provide the benefit, described above in relation to the repulper approach, of beginning the separation by the downstream spiral trough part 150 with a slurry that is in an already partially separated state.

The described approach is also considered to provide benefits of the approach set out in PCT/AU2019/051413, such as providing a thoroughly mixed, highly fluidised slurry to the downstream spiral trough part 150, facilitating inward migration and consequent separation of heavy mineral particulates that might otherwise be locked up in the gangue or fluid parts of the flow, and increasing the probability of greater concentrate mass and grades on a second or subsequent stage.

Figure 4:
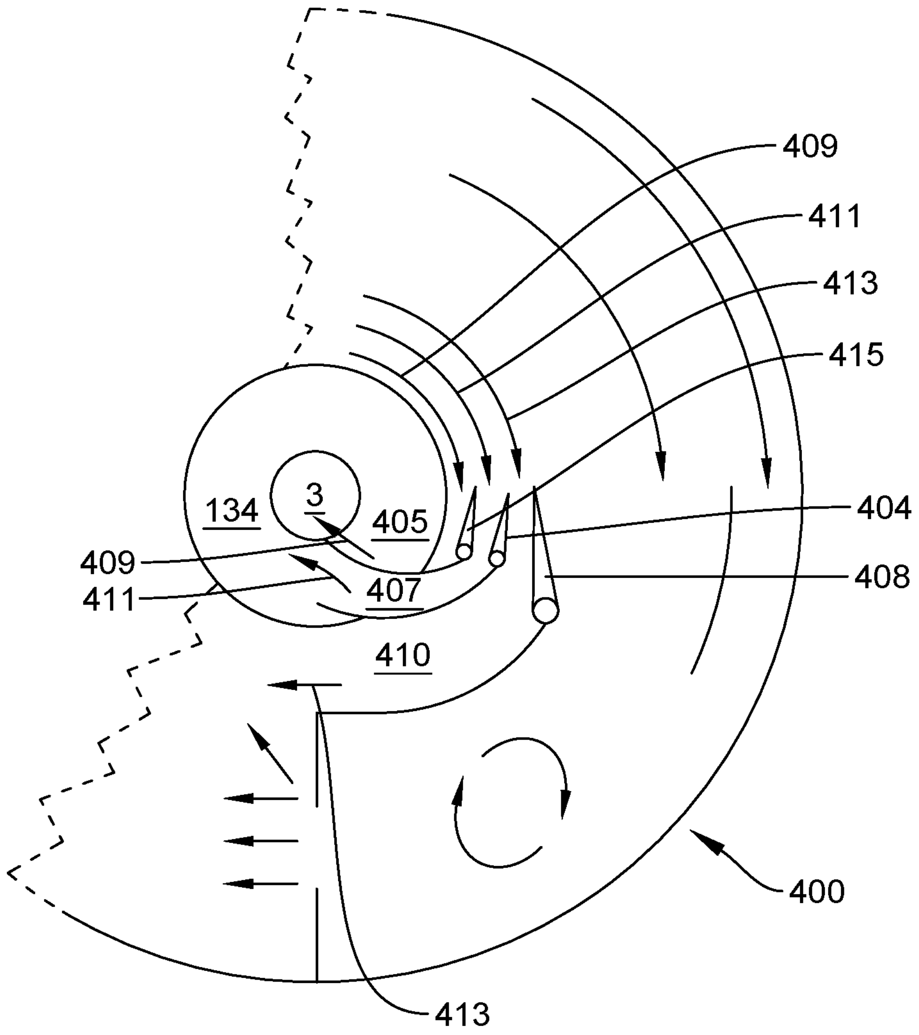
FIG. 4 is a schematic plan view illustrating an alternative embodiment of an apparatus in accordance with the present disclosure.

FIG. 4 illustrates a variation 400 to the embodiment 300 of FIG. 3, in which the concentrate part is split into a higher grade concentrate part (which may be regarded as a 'super-concentrate' or 'super-con' part) and a lower grade concentrate part.

Similarly to the embodiment 300, the embodiment 400 provides a first splitter, designated by the reference numeral 404, for splitting a concentrate part of the slurry flow from the rest of the slurry, and a second splitter, designated by the reference numeral 408, for splitting the non-concentrate part of the mineral slurry flow to split a semi-concentrate part 413 of the slurry flow from a remainder part of the slurry flow. The embodiment 400 further provides an additional or further splitter 415, for splitting the concentrate part into a higher grade concentrate part 409 and a lower grade concentrate part 411. In the illustrated embodiment 400, a higher grade concentrate channel 405 directs the higher grade concentrate part 409 into an offtake arrangement provided in the central column 3, and a lower grade concentrate channel 407 directs the lower grade concentrate part 411 into a concentrate gutter 134 of the separator. Apart from this, the embodiment 400 may be substantially identical to the embodiment 300. (As foreshadowed by above discussion in relation the embodiment 300, providing adjustability of the first splitter 404 and additional or further splitter 415 is considered highly advantageous, but it may be desirable for the second splitter 408 to be non-adjustable.)

The semi-concentrate part or fraction, may be regarded as a 'near' grade mid, not sufficiently upgraded to remove as a concentrate part, but nonetheless having a sufficient concentration of desired heavy mineral to provide a significant improvement in separation on the downstream stage by having this part of the slurry flow fed onto a radially inner part of the top of the downstream stage, rather than mixing it with the other non-concentrate parts of the slurry (which have a substantially lower proportion of desired mineral to gangue). It will be appreciated that mixing the semi-concentrate part with the other non-concentrate parts of the slurry may be regarded as undoing some of the separation achieved by the first, upstream, stage.

It should be appreciated that in variations of the embodiments 300 and 400 the splitters do not necessarily need to be arranged in a radial line. For example, the second splitter 308 or 408 may be slightly upstream of the first splitter 304 or 404, if desired. In this case, it should still be considered that the second splitter 308 or 408 splits the non-concentrate part of the mineral slurry flow to split a semi-concentrate part of the slurry flow from a remainder part of the slurry flow, notwithstanding that the concentrate part of the slurry flow has not been split from the semi-concentrate part of the slurry flow. In a variation of the embodiment 400, the additional or further splitter 415 may be slightly upstream of the first splitter 404. In this case, it should still be considered that the additional or further splitter 415 splits the concentrate part into a higher grade concentrate part and a lower grade concentrate part, notwithstanding that the concentrated part has not yet been split from the non-concentrate part of the flow.

Figure 5:
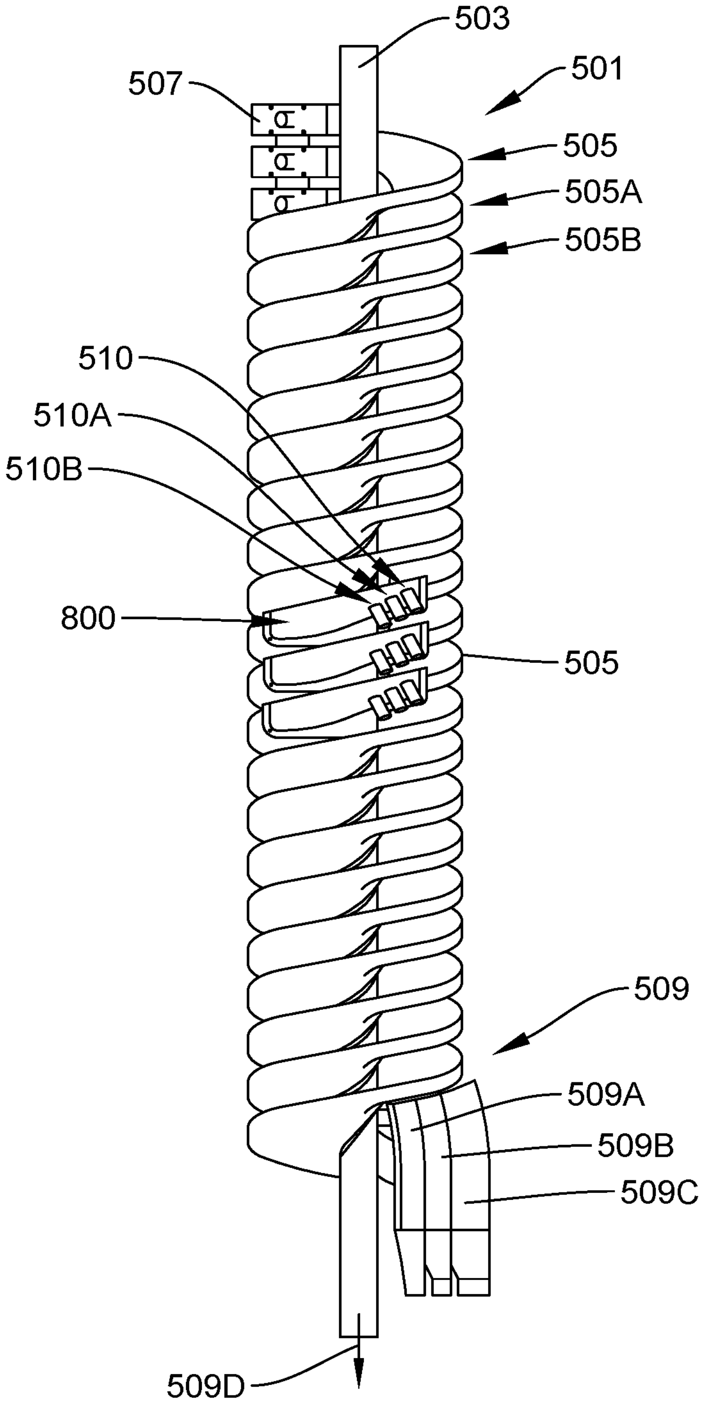
FIG. 5 is a schematic front elevation of a three-start, two stage, spiral separator including a further embodiment of an apparatus in accordance with the present disclosure.

FIG. 5 illustrates an embodiment of a spiral separator, generally designated by the reference numeral 501, which includes of an apparatus 800, which is an embodiment of an apparatus in accordance with the present disclosure, and which is illustrated in, and described below with reference to FIGS. 7 to 11.

The spiral separator 501, as illustrated in FIG. 5, comprises an upright central column 503 supporting three spirals 505, 505A and 505B.

Figure 6:
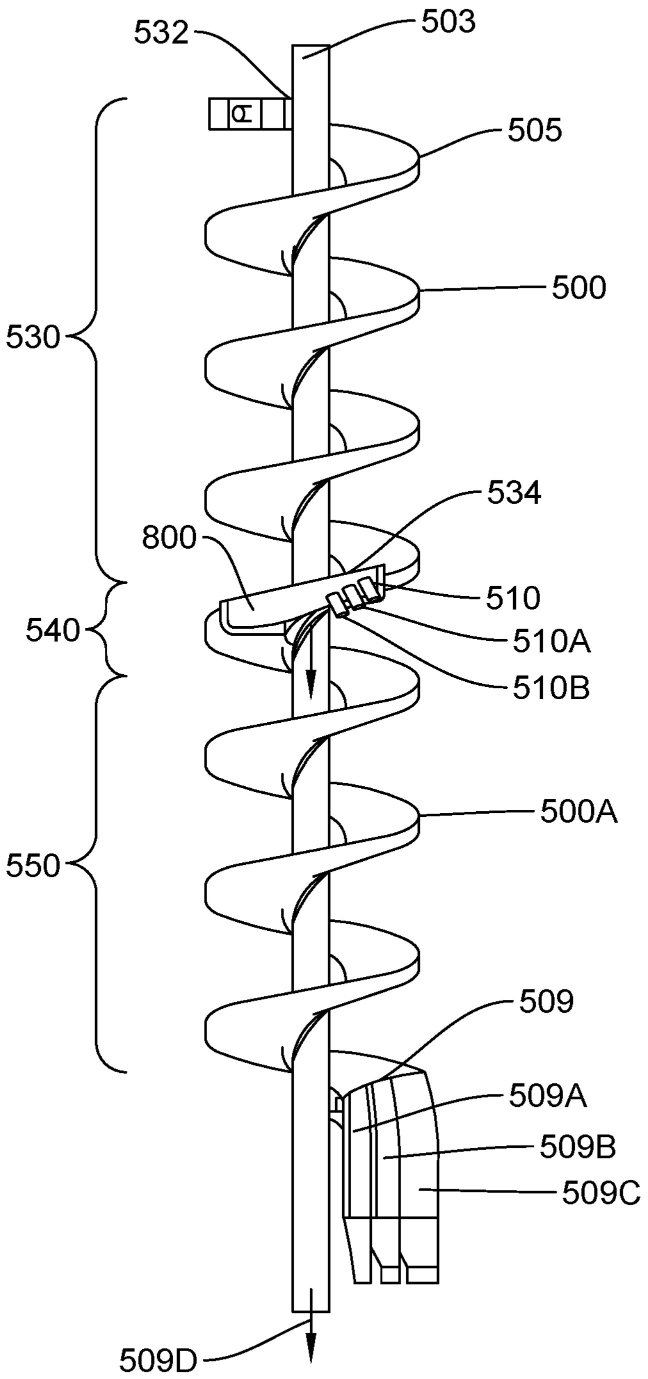
FIG. 6 is a schematic front elevation showing a single spiral of the spiral separator of FIG. 5.
Figure 7:
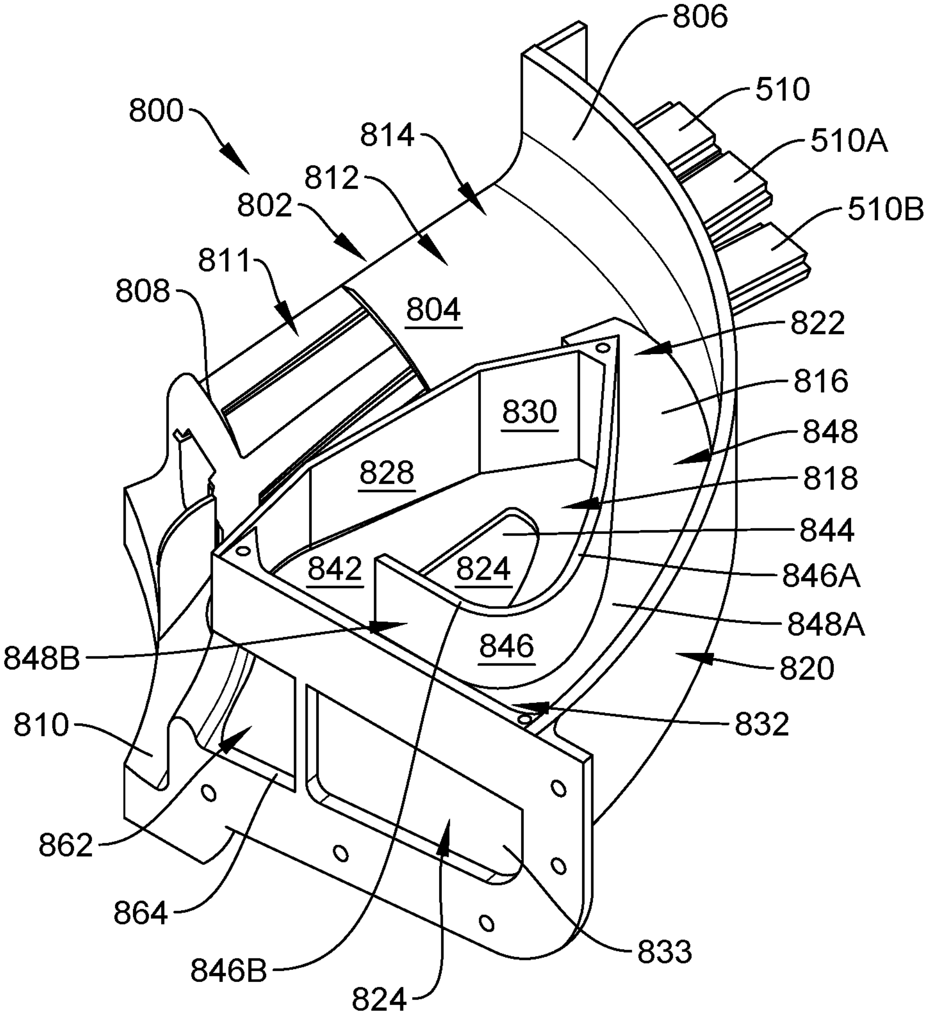
FIG. 7 is a schematic perspective view from an in-use more downstream end, of an apparatus in accordance with the present disclosure which can be used in the spiral separator of FIG. 5.

FIG. 6 shows for clarity, only a first of the three spirals, designated by the reference numeral 505. The second and third spirals 505A and 505B, shown in FIG. 1, are substantially identical to spiral 505 (and each also includes an apparatus substantially corresponding to apparatus 800).

As will be appreciated by those skilled in the field of spiral separators for wet gravity separation, the spiral separator 501, having three spirals, may be regarded as a “three start” separator.

In the embodiment illustrated in FIG. 5, the second and third spirals 505A, 505B are arranged so that each respective turn of each of the second and third spirals is substantially below the corresponding turn of the first spiral 505. As the three spirals of the separator 501 are substantially identical, for simplicity and clarity only the first spiral 505 will be described in detail, and it should be appreciated that where only one spiral is explicitly described or illustrated, the other spirals correspond. However, it should also be appreciated that the present disclosure is not limited to a spiral separator having three spirals, but is also applicable to spiral separators having a single spiral, two spirals, or four or more spirals, that is, generally, to single-start and to multiple-start spiral separators.

A conventional arrangement (not shown), for example including a powered pump, is provided for admitting a slurry or pulp to each spiral via a feedbox, for example feedbox 507, at a predetermined rate, at or adjacent the top of the spiral. The feedbox 507 may be a conventional type of feedbox having stilling baffles (not shown) installed internally to slow and “still” the feed allowing low velocity entry of the slurry or pulp onto the first turn of the corresponding spiral. The terms slurry and pulp, as used herein, should be considered to be used interchangeably. Similarly the terms helix and spiral should be considered to be used interchangeably, unless context dictates otherwise A splitting arrangement 509, which may be a conventional splitting arrangement, is provided at the bottom of each spiral 505, 505A, 505B for splitting the descending slurry stream into fractions (for example corresponding to radially distributed streams or bands) and recovering certain desired fractions. In the illustrated embodiment the splitting arrangement 509 comprises splitters (not shown) and off-take channels 509A, 5099B, 509C provided to split and off-take the descending slurry flow into a concentrates fraction, a middlings fraction and a tails fraction, respectively. The separator 501 further includes a fourth off-take channel 509D for material from an off-take arrangement provided in the central column 3, which in described embodiments is a higher grade concentrate.

The spiral separator 501 may be regarded as a two-stage separator, comprising a first stage 530 and a second stage 550.

The first stage 530 comprises a first helical trough part of each spiral, for example a first, or upstream, helical trough part 500 of the first spiral 505. In the illustrated embodiment the first helical trough part 500 is 3.5 turns from a pulp feed point 532, where pulp is fed onto the first helical trough part 500 by the feedbox 507 to a concentrate off-take point 534 provided at or adjacent the downstream end of the first helical trough 100, that is, substantially at the end of the first stage 530. The off-take point is associated with the apparatus 800. As illustrated in FIGS. 5 and 6 the apparatus 800 includes slide splitter slides 510, 510A, 510B for adjusting slide splitters of the apparatus 800.

Directly downstream of the first stage 530 there is provided a mixing region 540 for remixing more fluid and less fluid parts of the slurry which exit the first stage 530, as foreshadowed by the preceding description. In the illustrated embodiment the mixing region is provided by apparatus 800. The second stage 550 is directly downstream of the mixing region 540, and comprises a second helical trough 500A which is 3.5 turns from a pulp feed point where pulp exits the mixing region 540 and is fed onto the second helical trough 500A, to an off-take point at the splitting arrangement 509. The first and second helical trough parts 500, 500A of the first spiral 505 may be substantially identical, each providing a substantially similar trough shape and variation of floor angle over corresponding turns, as described in PCT/AU2019/051413. If desired, one or more further similar stages may be provided, with each stage being separated by a mixing region.

The shape and configuration of the spiral troughs is preferably in accordance with those described and/or claimed in PCT/AU2019/051413, although other types of trough, including troughs with a different number of turns, may of course be substituted if desired.

With reference to FIGS. 7 to 11 a particular embodiment of an apparatus 800 for a spiral separator, will now be described in more specific detail, with reference, by way of example, to its use in the spiral separator 501.

The apparatus 800 provides a slurry entry region 802 at an upstream part thereof for entry of slurry exiting the trough 500 of the first stage 530. The slurry entry region 802 provides a trough floor part 804 configured to be continuous with the trough floor of the first trough 500 at the most downstream end of the first trough 500, so that slurry can flow substantially unimpeded from the first trough 500 onto the apparatus 800.

The apparatus 800 provides an upstanding radially outer wall 806, which in use is generally continuous with an upstanding outer wall of the trough 500, and an upstanding inner wall part 808, which in use is generally continuous with the upstanding inner wall part (which may correspond generally to the upstanding inner wall part 132 of the trough 100), and provides a radially inner concentrate gutter 810 which in use is generally continuous with a radially inner concentrate gutter of the separator (which may correspond generally to the concentrate gutter 134 of the trough 100). It will be appreciated that in the illustrated embodiment a radially inner wall of the concentrate gutter 810 will be provided by the central column 503 (not shown in FIGS. 8 to 11).

The apparatus 800 provides a radially inner region 811 of the trough floor 804. The radially inner region 811 receives parts of the slurry flow which have a relatively high concentration of desired heavy mineral, due to separation on the upstream (for example, first stage) spiral trough part 500. Provided on or in the radially inner region 811 are inlets to a super concentrate channel, a concentrate channel and a bypass channel, and associated splitting arrangements are also provided in or on the trough floor, as will be described in due course.

A radially intermediate region 812 of the trough floor 804, which is inclined downwardly in the downstream direction receives a high solid content, or middlings, part of the slurry flow, corresponding generally to a radially intermediate component 216 discussed above, from the upstream (for example, first stage) spiral trough part 500. This high solid content, or middlings, part of the slurry flow may include most or all of a central, dewatered slug of material, as discussed above.

A radially outer region 814 of the trough floor 804 receives a high velocity, high water content stream, corresponding generally to a high water content most radially outward component 218 discussed above, from the first stage 530. It will be appreciated that the high velocity water stream will also extend some way up the radially outer wall 806. The radially outer region 814 of the trough floor 804 transitions into a guide or ramp arrangement 816, which in use directs the high velocity water stream into an upper compartment 818 of a box-like arrangement 820 via an upper opening 822.

The radially intermediate region 812 of the trough floor 804 conveys the low-fluidity high solid content, or middlings, part of the slurry flow (which may correspond generally to the radially intermediate component 216 discussed above, which has relatively low water content and fluidity) from the first stage 530 in the downstream direction into a lower compartment 824 of the box-like arrangement 820, via a lower opening 826.

The box-like arrangement 820 has a radially outer wall, provided by the radially outer wall 806, and a radially inner wall 828. The box-like arrangement 820 further comprises an upstream end wall 830 and a downstream end wall 832. A lower edge 834 of the upstream end wall 832 is vertically spaced apart from the intermediate region 812 of the trough floor part 804, to thereby provide the lower opening 826 therebetween. The downstream end wall 832 provides a lower, radially outer, outlet opening 833 for egress of prepared mixed remainder part of the slurry onto a downstream spiral trough, for example 500A. The downstream end wall 832 and or outlet opening 833 may further provide a deflection member, for example in the form of a vane 835 (shown in FIG. 9) for deflecting wash water from part (for example an uppermost, most-fluid, part) of the exiting slurry flow towards the semi-concentrate stream, in order to refluidise the semi-concentrate stream and facilitate mobility and, in particular, radial mobility which provides concentration of the desired mineral in the downstream trough part. Alternatively, the deflection member may be omitted, and wash water may be added to the semi-concentrate stream at the upstream end of the downstream trough part by some other arrangement.

Figure 8:
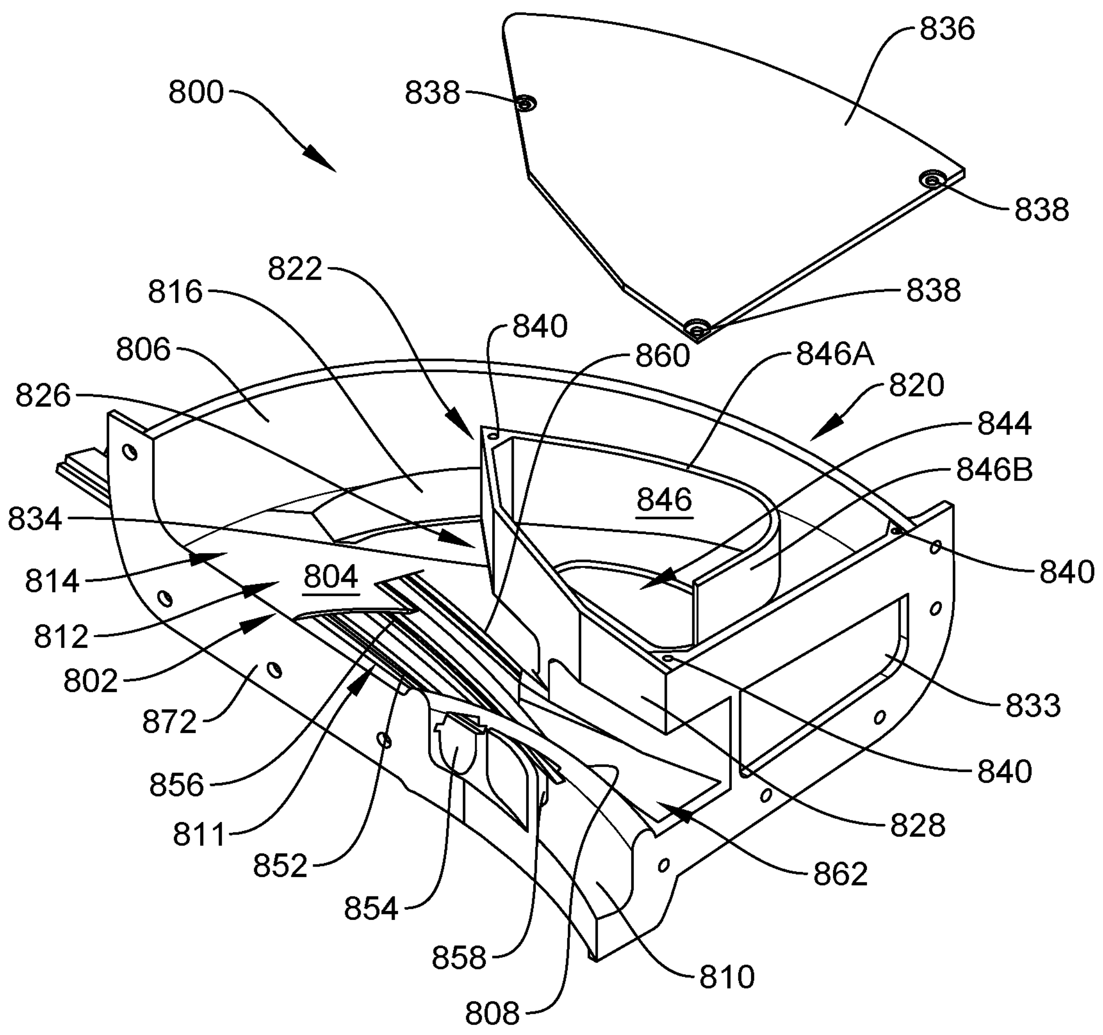
FIG. 8 is a further schematic perspective view of the apparatus of FIG. 7, showing a lid separate thereto.
Figure 8A:
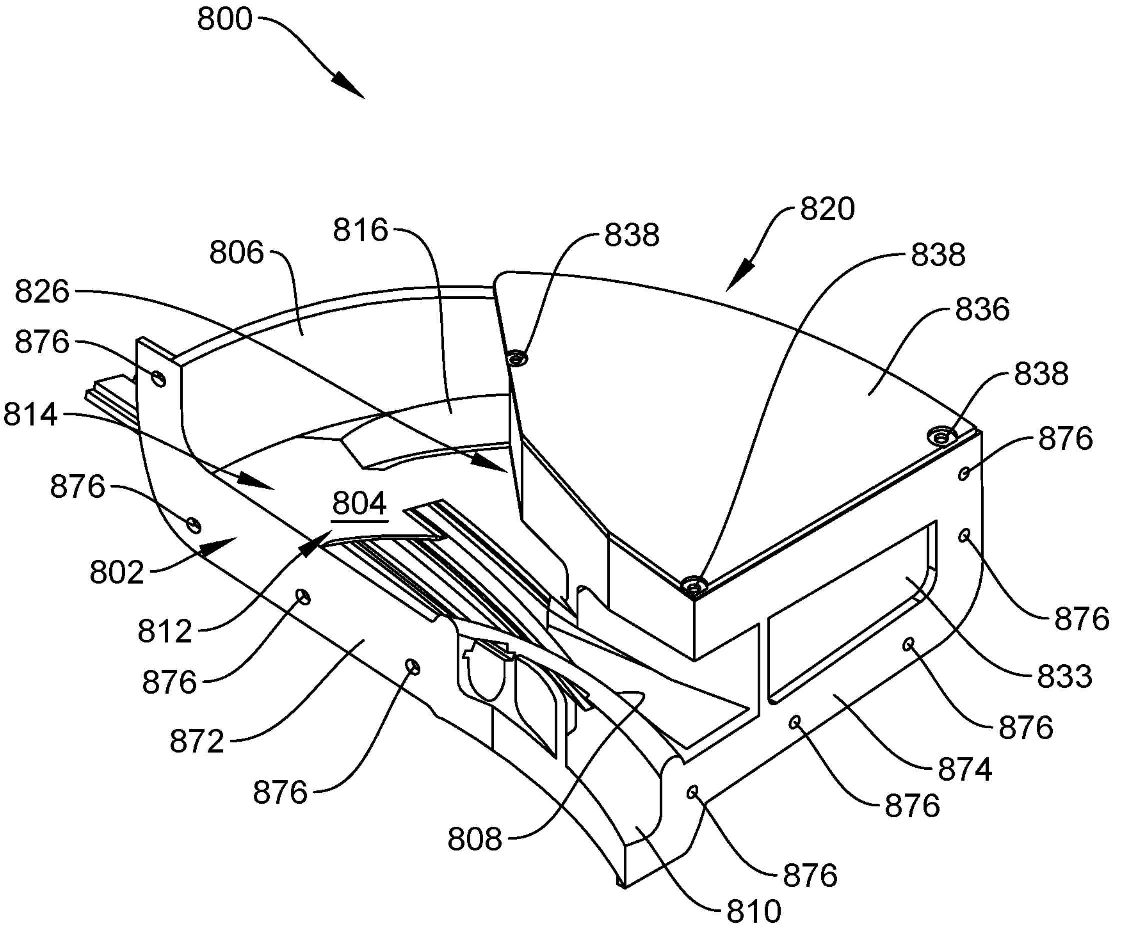

The box-like arrangement 820 further comprises a lower floor, provided by the trough floor part 804 and an upper cover 836 (shown only in FIGS. 8 and 8(*a*)). In the illustrated embodiment the upper cover 836 is in the form of a removable close-fitting lid, which is provided with fixing apertures 838, which in use align with complementary fixing apertures 840, provided in the upstream end wall 830 and downstream end wall 832, to allow the lid to be securely attached using fixings such as screws (not shown).

The box-like arrangement 820 further comprises an intermediate floor part 842, which separates the upper compartment 818 and lower compartment 824. The intermediate floor part 842 provides an opening 844 through which the high water content part of the remainder part of the slurry flow drops onto, and into, the high solids content part of the remainder part of the slurry which is progressing through the lower compartment 824, beneath the opening 844.

The upper compartment 818 provides a dividing wall 846 to define a convoluted, serpentine passageway 848 through the upper compartment 818, for passage of the high water content part of the slurry flow. In the illustrated embodiment the dividing wall 846 provides a first dividing wall part 846A substantially parallel to and spaced apart from the radially outer wall 806, and a second dividing wall part 846B substantially parallel to and spaced apart from the downstream end wall 832. The passageway 848 is thus configured to provide a first passageway part 848A between the first dividing wall part 846A and the radially outer wall 806, and a second passageway part 848B between the second dividing wall part 846B and the downstream end wall 832, with pronounced directional changes between the passageway parts.

It will be appreciated that the high water content part of the slurry flow must flow through the passageway 846, before it reaches the opening 844. The flow through the passageway 846, with substantial directional changes and at least one reversal in direction, substantially reduces the kinetic energy and downstream momentum of the high water content part of the slurry flow, due to the baffle effect of impacts with the walls of the passageway and the creation of turbulence in the water. The high water content part of the slurry flow may impact and be further baffled by impacts with further wall parts, such as the downstream-side surface of the upstream end wall 830, the radially inner surface of the first dividing wall part 846A, and the upstream-side surface of the second dividing wall part 846B, as can be seen, for example in FIG. 11, in which the route of the high water content part of the slurry flow is schematically illustrated by a series of arrows 886. Thus by the time the water from the high water content part of the slurry flow falls through the opening 844, its kinetic energy and downstream momentum have been effectively dissipated.

The falling of the water onto the high solids content slurry below provides effective mixing without imparting substantial downstream velocity to the remainder part of the slurry as a whole. This provides a mixed, low velocity, low viscosity slurry, which is then directed by a suitable guide arrangement in the lower compartment 824 to the outlet opening 833, to provide a mixed remainder slurry feed onto a downstream (for example second or subsequent stage) spiral trough part, for example 500A. It is desired that the prepared mixed remainder slurry part flows into the second or subsequent stage in much the same well mixed and low velocity condition as the slurry exiting the feedbox 507 onto the first stage 530.

It is believed that the illustrated embodiment facilitates the low energy water passing down through opening 844 in a low velocity spiral, which enhances mixing with the high solid content part of the slurry in the lower compartment.

The upper compartment 818 of the box-like arrangement 820 may be regarded as an example of an energy dissipation region, and the box-like arrangement 820 may be regarded as an example of a mixing arrangement. The vicinity of the opening 844, may be regarded as an example of a drop region, which provides a vertically downward acceleration of material (water) from a more fluid stream to facilitate mixing of the water with a less fluid stream, which in this example is the high solid content middling stream from the first stage. At least some of the walls of the passageway 848 may be regarded as baffles, which at least contribute to dissipation of the kinetic energy of the more fluid, high water content part of the remainder part of the slurry.

It will be appreciated that the configuration of the ramp and passage, to provide a floor part which diverges upwardly relative to the trough floor, and therefore allows the high water content component to be elevated relative to the high solid content slurry flow is, at least in this embodiment, important to thereby provide the drop region.

It should be appreciated that in the illustrated embodiment the area under the guide or ramp arrangement 816 is solid material or blocked off by a blocking wall to prevent water from the high solid content flow migrating outwardly into this area, as such further dewatering of the already dewatered high solid content flow could further increase its viscosity sufficiently to undesirably impede flow, for example causing sanding.

In the illustrated embodiment the apparatus 800 provides first to third splitters in or on the radially inner region 811 of the trough floor 804.

A higher grade concentrate (or super concentrate) splitter 852 (corresponding generally in purpose to the additional or further splitter 415 of embodiment 400) is provided to off-take a higher grade concentrate part of the slurry flow, adjacent the concentrate gutter 810, from the slurry flow. A higher grade concentrate channel 854 directs the higher grade concentrate part into an off-take arrangement provided in the central column 503. A lower grade concentrate splitter 856 (corresponding generally in purpose to the first splitter 404 of embodiment 400) is provided to take a lower grade concentrate part of the slurry flow (adjacent and radially outward of the higher grade concentrate part) from the slurry flow. It should perhaps be noted that because the concentrate gutter 810 is radially inwards of the working surface of the trough, the higher grade concentrate channel 854, which may be connected to the interior of the tubular central column 503, may be regarded as "crossing" the concentrate gutter 810. In the illustrated embodiment the part of the apparatus defining the higher grade concentrate channel 854 may be regarded as providing a closed-off upstream end of the concentrate gutter 810. Such an arrangement is suitable for an apparatus provided between first and second stages of a spiral separator because there is no concentrate in the concentrate gutter in the first stage. However, for an apparatus for use between second and third (or subsequent) stages, it may be desirable to have the concentrate gutter 810 run continuously from the more upstream stage, through the apparatus of the type disclosed, to the more downstream stage, so that the concentrate can be conveyed between stages in the concentrate gutter 810. In this case, the higher grade concentrate channel 854 (and associated splitter) may be omitted altogether, may be omitted other than at the apparatus provided at the transition from the first stage to the second stage, or may (at least in second or subsequent transitions between stages) be routed in a manner which does not obstruct the concentrate gutter 810, for example being routed below the concentrate gutter 810.

A lower grade concentrate channel 858 directs the lower grade concentrate part into the concentrate gutter 810 of the separator. A bypass part splitter 860 (corresponding generally in purpose to the second splitter 408 of embodiment 400) is provided to split a semi-concentrate part of the flow from a remainder part of the flow. A bypass channel 862 directs the semi-concentrate part past the box-like arrangement 820 which, as indicated above, provides a mixing arrangement of the apparatus 800, into which the remainder part of the slurry flow (separated from the semi-concentrate part of the flow by the bypass part splitter 860) flows for mixing, as described above. As illustrated best in FIG. 8, part of the radially inner wall 828 of the box-like arrangement 820 acts as a radially outer boundary of the bypass channel 862, thereby segregating the semi-concentrate part of the flow (in the bypass channel 862) from the mixing process applied to the remainder part. The bypass channel 862, provides a bypass channel outlet 864, adjacent to and radially inward of the outlet opening 833 of the mixing arrangement (e.g. the box-like arrangement 820) for feeding the semi-concentrate part onto the downstream spiral trough, for example 500A (not shown in FIGS. 8 to 11).

The splitters 852, 856, 860 may be of any appropriate type, and may, for example, be rotatable vane splitters as illustrated in relation to the embodiments 300 and 400. In the illustrated embodiment 800, the splitters are slide splitters, each comprising a slot in the trough floor extending in substantially the radial direction of the separator, which provides a variably sized throat for receipt of a part of the slurry thereinto. The slide splitters each further comprise a respective slide member 510, 510A, 510B, attached to the underside of the floor of the apparatus 800 by guide tracks (not shown) in which the slide members are slideably movable to adjust the size (or length) of the splitter throat, and thereby adjust the radial point at which a split is taken. Slide splitters are known per se and, for example, described in U.S. Pat. No. 4,189,378, to Wright et al, published in 1980. It is therefore not considered necessary to provide a more detailed description herein. Nonetheless an example of a slide member 866 for a slide splitter is illustrated in FIG. 10. As illustrated in FIG. 10, the radially inward end of the slide member may provide a vane arrangement 868 with a sharp leading edge 870, to facilitate splitting of the slurry flow, in accordance with the teaching of U.S. Pat. No. 4,189,378. However, and in accordance with the apparatus as illustrated in FIGS. 7 to 9 and 11, it is not considered necessary to include the vane member in the splitters of the apparatus 800. As foreshadowed above in the description of embodiments 300 and 400, in a variation the bypass part splitter need not be adjustable during use of the separator, or even over the life of the apparatus 800, but may be a non-adjustable splitter. In this case the bypass part splitter may be provided by, for example, a suitably configured and positioned recess and/or upstanding projection in and/or on the trough floor 804, and/or by an extension or edge part of a wall of the mixing arrangement (box-like arrangement 820), or by a configurations as described in FIG. 11(*a*) which will be described in due course.

At least a floor part of the apparatus 800 may be manufactured as a single integral unit with at least one of the upstream and downstream spiral troughs. However, in the illustrated embodiment, the apparatus 800 and each of the upstream and downstream spiral troughs 500, 500A is manufactured as a separate modular unit.

The apparatus 800 therefore provides arrangements for facilitating connection to the upstream and downstream spiral troughs 500, 500A. The apparatus 800 provides upstream and downstream flanges, with the upstream flange 872 adapted to allow coupling to a downstream flange (not shown) of a trough located upstream of the apparatus 800, and the downstream flange 874 adapted to allow coupling to an upstream flange of a trough located downstream of the apparatus 800. The flanges 872, 874 may be provided with fixing holes 876 to facilitate connection using fasteners such as screws or bolts. In the illustrated embodiment, the configuration of the downstream flange 874, as well as the positioning of the outlet opening 833, are similar to functionally similar parts of the feedbox 507, so that the configuration of a flange plate of a trough part which is suitable for attachment to the feedbox 507 is also suitable for attachment to the downstream flange 874 of the apparatus 800.

Figure 9:
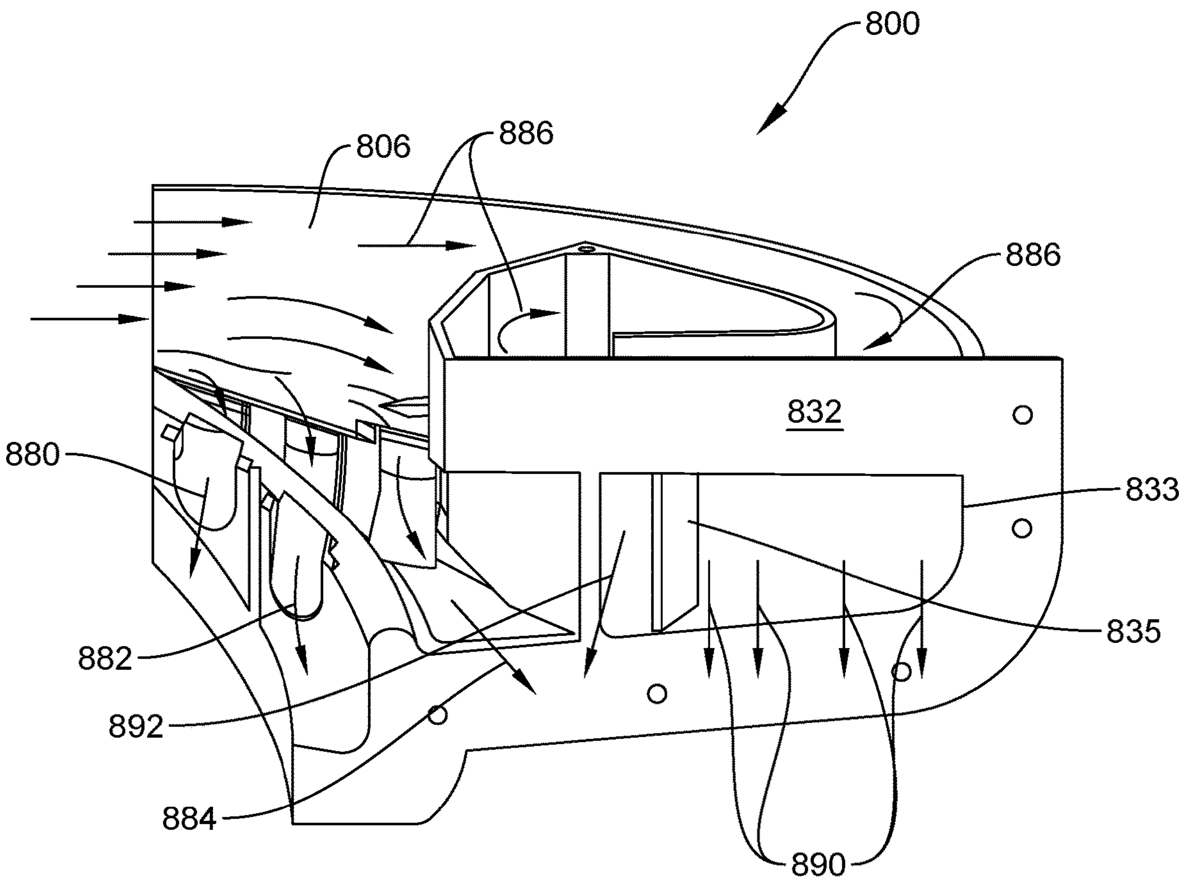
FIG. 9 is a further schematic perspective view of the apparatus of FIG. 7 including arrows to illustrate flow of slurry, in use.
Figure 10:
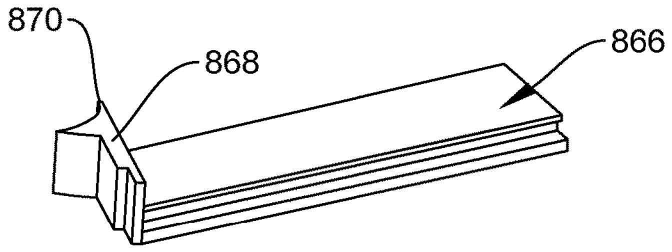
FIG. 10 is a schematic perspective view of part of a splitter arrangement which may be used in the embodiment of FIGS. 7 to 9.
Figure 11:
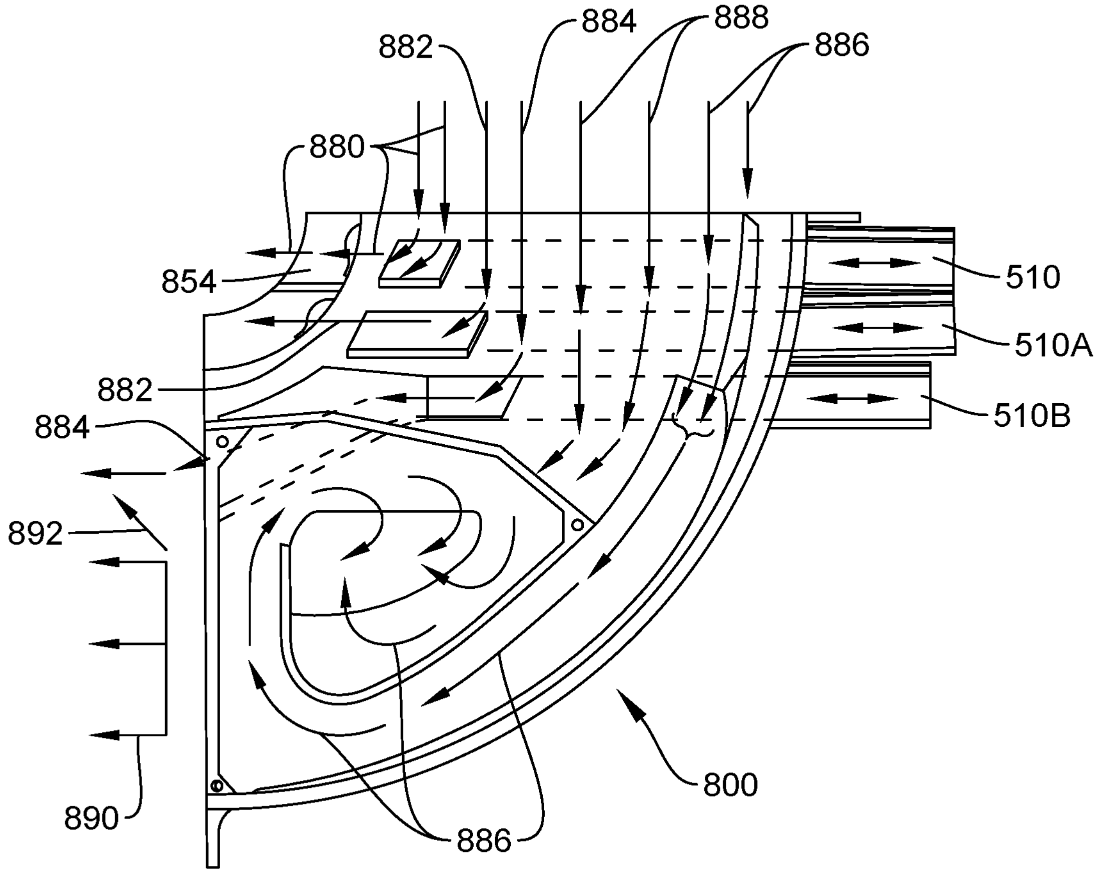
FIG. 11 is a schematic plan view of the embodiment of FIGS. 7 to 9 including arrows to illustrate flow of slurry, in use.
Figure 11A:
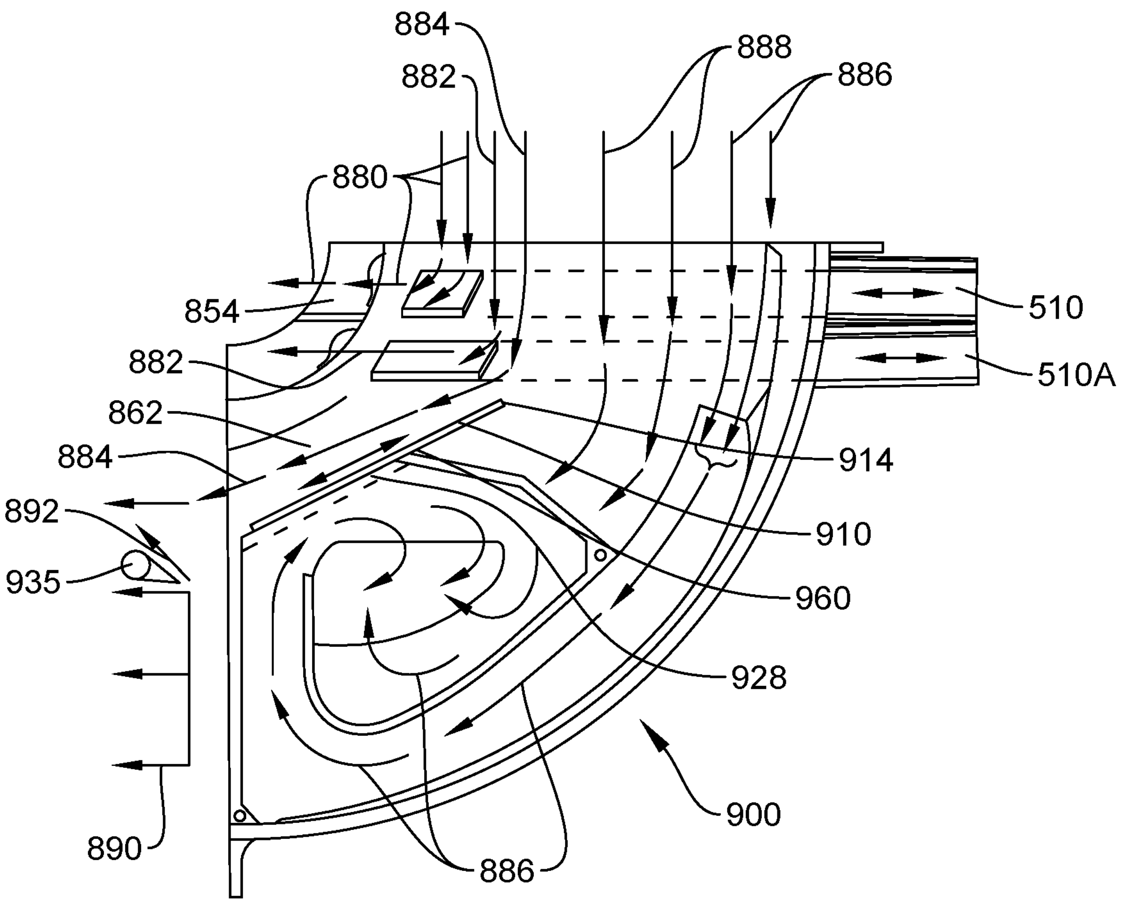
Figure 11B:
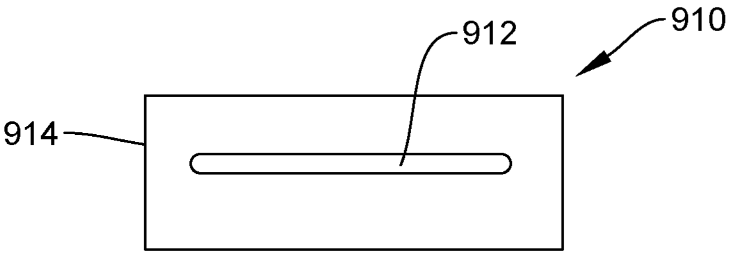

It should be appreciated that the various series of arrows in FIGS. 9 and 11 are intended to schematically illustrate flow of the slurry through the apparatus 800 in use. Broadly: the series of arrows designated 880 indicates flow of a superconcentrate stream through superconcentrate (higher grade concentrate) channel 854 which may be fluidly connected to the interior of the tubular central column 503; the series of arrows designated 882 indicates flow of a lower grade concentrate stream through lower grade concentrate channel 858 (and, in the illustrated embodiment, into concentrate gutter 810); the series of arrows designated 884 indicates flow of a semi-concentrate stream through the bypass channel 862, which opens onto a radially inner region of a downstream trough part; the series of arrows designated 886 indicates flow of the more fluid outer stream from the more upstream trough along the ramp arrangement 816 and through the passageway 848 and upper compartment 818 into the opening 844; the series of arrows designated 888 indicate flow of the of less fluid stream, which in this example is the high solid content middling stream from the more upstream trough, into the lower compartment 824 via the lower opening 826; the arrows designated 890 indicate flow of the prepared, low energy remainder slurry resulting from mixture of the more fluid outer stream and the less fluid high solid content middling stream, for entry onto the next-stage trough; and the arrows designated 892 indicate a part of the relatively fluid prepared, low energy slurry deflected at the outlet opening 833 to fluidise the semi-concentrate stream exiting from the bypass channel 862.

Comparative testing of a separator 501 as described above, including apparatus 800 between the two stages, and an identical separator but using a slurry preparation apparatus in accordance with the disclosure of PCT/AU2019/051413 with a similar mixing arrangement, but without bypass of a semi-concentrate part (so that all parts of the slurry that are not removed as concentrate at the bottom of the first stage are thoroughly mixed before being fed onto the second stage) has provided results indicating that the separator 501 as described above, including apparatus 800, provides substantially better separation performance on the second stage.

For example, in one test, with a slurry feed rate of 2.5 tonnes per hour and a heavy mineral content of 3-5%, the first stage concentrates off-take was about 76% of the heavy mineral in the slurry for both of the separators, but the second stage heavy mineral concentrate off-take was a further 20% for the separator 501 as against about 16% for the separator without semi-concentrate bypass. (All percentages rounded to the nearest percent.) Notably, the separator 501 was operated with a greater mass take to concentrate in the second stage, but nonetheless obtained a better grade of concentrate in the second stage concentrate. The test was performed with the separators side by side, with mineral slurry provided by a common shared feed.

Comparative testing of the separator using a slurry preparation apparatus in accordance with the disclosure of PCT/AU2019/051413, against a spiral separator using a repulper system, indicates that the repulper separator provides worse separation when both are operated at optimum effectiveness, but comparatively improves as the mass take at the end of the first stage is reduced, and outperforms the separator of PCT/AU2019/051413 when the mass take at the end of the first stage is low. Having the 'near miss' semi-concentrate part bypassing the mixing arrangement is believed to avoid, or at least substantially mitigate, the reduction in separation performance as the mass take at the end of the first stage is reduced.

FIG. 11(*a*) illustrates an apparatus 900 which embodies some variations from the embodiment 800. The apparatus has many similarities with the apparatus 800, and accordingly the following description focusses on the similarities, and the same reference numerals as are used in relation to features of the apparatus 800 are used in relation to corresponding features of the apparatus 900.

One difference between the apparatus 900 and the apparatus 800 is the form of adjustable bypass part splitter, corresponding generally in function to the bypass part splitter designated by reference numeral 860 in the apparatus 800, which is provided to split a semi-concentrate part of the flow from a remainder part of the flow. Apparatus 900 provides an adjustable bypass part splitter 960, having a splitter member in the form of a splitter blade 910. The splitter blade 910 is attached to part of a radially inner wall 928 (corresponding generally radially inner wall 828 of apparatus 800, but shaped to receive the splitter blade 910 against its external, radially inner, surface) of the box-like arrangement 820 which provides the mixing arrangement of the apparatus. The splitter blade 910 may be in the form of a generally rectangular plate, and is illustrated in side elevation (that is, substantially from a direction perpendicular to its major faces) in FIG. 11(*b*). As shown in FIG. 11(*b*) the splitter blade 910 is provided with an elongate slot 912 extending in its length direction. The elongate slot 912 is adapted to receive one or more fasteners (not shown), for example threaded fasteners such as bolts, therethrough to allow mounting of the splitter blade 910 to the radially inner wall 928. In an embodiment the bolts are fixedly mounted into the radially inner wall 828 of apparatus 800 and extend perpendicularly away therefrom. The splitter blade 910 can be mounted to the wall by placing it so that the elongate slot 912 receives the bolts therethrough, positioned appropriately for the desired split, in its length direction, and secured by tightening nuts (not shown) onto the bolts. Of course, many variations in adjustably mounting a splitter blade to the mixing arrangement are possible.

The position of the splitter blade 910 may be adjusted by loosening the nuts, moving the splitter blade in its length direction (also the direction of elongation of the elongate slot 912) to a desired position, and then tightening the nuts to secure the splitter blade 910 in position. It will be appreciated that the splitter blade 910 is oriented in use so that movement in its length direction (illustrated schematically by the double-headed arrow adjacent the splitter blade in FIG. 11(*a*)) changes the radial position in the trough of an upstream edge 914 of the splitter blade. It will also be appreciated that, in use, slurry that has passed the concentrate offtakes and which is radially inside the upstream edge 914 of the splitter blade 910 is directed into the bypass channel 862, and that slurry which is radially outside the upstream edge 914 of the splitter blade 910 is directed into the mixing arrangement. Thus the adjustability in the position of the splitter blade 910, in its length direction, allows adjustment of the semi-concentrate split 884 which bypasses the mixing arrangement. At least the part(s) of the splitter blade 910 which extend upstream of the radially inner wall 928 should, in use, be in contact with the trough floor in order to provide an effective split. To accommodate this, in apparatus 900 the parts of the trough floor which are contacted by the splitter blade 910 as it moves, have a linear shape (not shown).

In an embodiment, the box-like arrangement 820 is configured so that in the absence of a splitter blade the structure of the box-like arrangement itself provides a split between the semi-concentrate and remainder parts of the slurry and directs the former into the bypass channel, allowing the latter to enter the mixing arrangement. In a particular example the most upstream edge of the radially inner wall 928 of the box-like arrangement 820 is able to act as a fixed splitter, so that, in use, slurry that has passed the concentrate offtakes and which is radially inside the upstream edge of the radially inner wall 928 is directed into the bypass channel 862, and so that slurry which is radially outside the upstream edge of the radially inner wall 928 is directed into the mixing arrangement. This provides a fixed splitter. A splitter blade 910 could be used with such an embodiment (as described in relation to apparatus 900) provide an adjustable bypass splitter, while providing the option of removing or omitting the splitter blade to provide a fixed splitter which takes a minimum semi-concentrate/bypass split.

The use of a splitter blade as described can provide a splitter member which is easy to mount and adjust, and simple and economical to manufacture, and to replace if worn.

A further difference between the apparatus 900 and the apparatus 800 is that no vane 835 is provided at the outlet of the mixing arrangement, for deflecting washwater from the slurry flow exiting the mixing arrangement to refluidise the semi-concentrate stream. Instead, a water diverter 935 which diverts wash water 892 into the semi-concentrate stream which has bypassed the mixing arrangement, is provided now a feature added to the trough upon exit from the restarter box but remains functionally the same as the earlier embodiment. The water diverter 935 may comprise a rotatably adjustable boss, for example mounted to the trough floor by bolting so that it can rotatably adjusted when the mounting is loose and secured in a desired rotational position by tightening the mounting, and a water deflection part (for example a wedge-shaped member) for directionally diverting wash water. Thus an adjustable water diverter may be provided.

Figure 12:
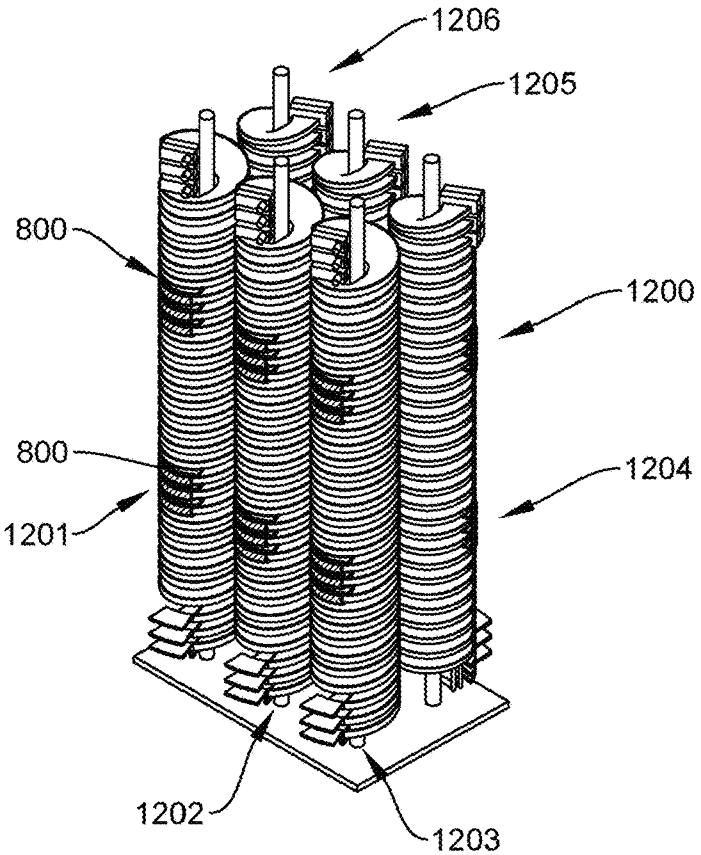
FIG. 12 is a schematic perspective view, from above, front and one side, of an array of six three-start, three stage, spiral separators each including an embodiment of an apparatus in accordance with the present disclosure.
Figure 13:
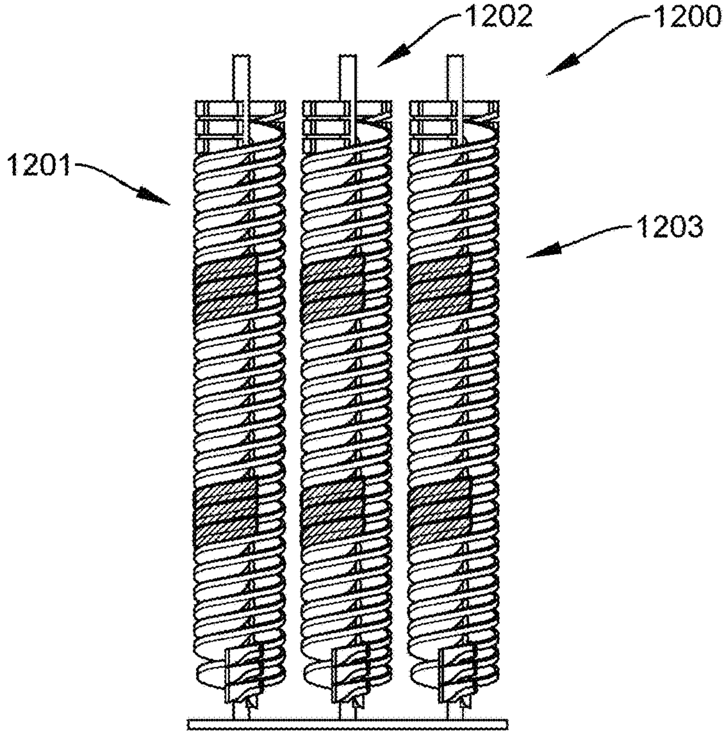
FIG. 13 is a schematic front elevation of the array of FIG. 12.

FIGS. 12 and 13 illustrate an array an array 1200 of six three-start, three stage, spiral separators 1201 to 1206, each including an embodiment of an apparatus 800 (or, alternatively, 900) in accordance with the present disclosure, between the first and second stage and between the second and third stage. The six separators of the array are each mounted to a common base, to facilitate provision to, and installation in, a mineral processing plant.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A spiral separator comprising:

an upstream spiral trough part;

a downstream spiral trough part, downstream of the upstream spiral trough part, the downstream spiral trough part having a trough floor configured such that in use more dense mineral particles migrate inwardly from an outer region, across the trough floor, to concentrate at an inner region thereof; and an apparatus provided operatively intermediate the upstream and downstream spiral trough parts of said spiral separator, the apparatus comprising:

a slurry receiving region for receiving a mineral slurry flow, comprising more dense mineral and less dense mineral from said upstream spiral trough part of said spiral separator;

a first splitter for splitting a concentrate part of the received mineral slurry flow from a semi-concentrate part of the mineral slurry flow, the first splitter defining a first splitting position;

a concentrate channel part radially further inward of the first splitting position;

a second splitter for splitting the semi-concentrate part of the slurry flow from a remainder part of the slurry flow, the semi-concentrate part comprising a lower concentration of the more dense mineral than the concentrate part; and the semi-concentrate part comprising a higher concentration of the more dense mineral than the remainder part, the second splitter defining a second splitting position further radially outward than the first splitting position;

a semi-concentrate channel part radially further outward than the first splitting position and radially further inward than the second splitting position;

a mixing region for mixing a more fluid radially more outward part of the remainder part with a less fluid radially more inward part of the remainder part, to form a mixed remainder part for feeding onto the downstream spiral trough part; and a semi-concentrate bypass channel for conveying the semi-concentrate part away from the semi-concentrate channel part and towards the downstream spiral trough part, wherein the apparatus and the semi-concentrate bypass channel are configured so that the semi-concentrate part bypasses the mixing region;

wherein the apparatus provides a semi-concentrate outlet, configured to direct said semi-concentrate part from the bypass channel to the inner region of the more downstream trough part at an upstream part of the more downstream trough part; and wherein the apparatus provides a mixed remainder outlet, configured to direct said mixed remainder part from the mixing region to the outer region of the more downstream trough part at an upstream part of the more downstream trough part.

2. The spiral separator in accordance with claim 1, wherein the apparatus comprises a modular unit.

3. The spiral separator in accordance with claim 1, wherein the apparatus is an integral part of the spiral separator.

4. The spiral separator in accordance with claim 1, wherein at least one of the first and second splitters comprises an adjustable splitter member, for allowing adjustment of a split.

5. The spiral separator in accordance with claim 1, wherein the first splitter comprises an adjustable splitter member, for allowing adjustment of a split, and the second splitter comprises a fixed splitter.

6. The spiral separator in accordance with claim 1, wherein in use the semi-concentrate part is a part of a non-concentrate part of the mineral slurry flow and is radially closer to the first splitter than the remainder part.

7. The spiral separator in accordance with claim 1, wherein the semi-concentrate bypass channel is segregated from the mixing region; and wherein the apparatus comprises at least one wall part between the semi-concentrate bypass channel and the mixing region.

8. The spiral separator in accordance with claim 1, wherein the concentrate channel is configured to direct at least part of the concentrate part of the mineral slurry flow to at least one offtake selected from the group consisting of:

a concentrate part concentrate gutter provided radially inward of the inner region of the downstream trough part; and an interior of a central column of the spiral separator.

9. The spiral separator in accordance with claim 1, comprising a further splitter for splitting a higher grade part of the concentrate part from a lower grade part of the concentrate part, and comprising a first concentrate channel for the higher grade part of the concentrate part and a second concentrate channel for the lower grade part of the concentrate part.

10. The spiral separator in accordance with claim 1, wherein the mixing region comprises a mixing region trough floor part to receive the less fluid part of the remainder part and a passageway, distinct from said mixing region trough floor part, for passage of the more fluid part of the remainder part therethrough, and wherein the passageway has a passageway outlet opening.

11. The spiral separator in accordance with claim 10, wherein the mixing region is configured so that in use the passageway outlet opening is provided above the trough floor part, to allow the more fluid part of the remainder part to drop onto the less fluid part of the remainder part.

12. The spiral separator in accordance with claim 1, wherein the mixing region comprises an energy dissipation region to reduce kinetic energy of the more fluid part of the remainder part before the mixed remainder part exits the mixing region; and wherein the energy dissipation region comprises at least one selected from the group consisting of:

one or more baffles configured to reduce kinetic energy of the more fluid part of the remainder part; and a passageway for passage of the more fluid part of the remainder part therethrough, the passageway having a convoluted path.

13. The spiral separator in accordance with claim 1, wherein the apparatus comprises a wash water director to direct wash water from the remainder part of the slurry flow into the semi-concentrate part of the slurry flow on the downstream spiral trough part.

14. The spiral separator in accordance with claim 1, wherein the mixing region comprises a removable cover.

15. An spiral separator, for provision operatively intermediate upstream and downstream spiral trough parts of said spiral separator, the apparatus comprising:

a slurry receiving region for receiving a mineral slurry flow from said upstream spiral trough part of said spiral separator;

one or more splitters, configured to split the mineral slurry flow into a concentrate part, a semi-concentrate part and a remainder part, the semi-concentrate part comprising a lower proportion of more dense to less dense mineral than the concentrate part; and the semi-concentrate part comprising a higher proportion of the more dense to the less dense mineral than the remainder part;

a mixing region configured to mix a more fluid radially more outward part of the remainder part with a less fluid radially more inward part of the remainder part, to provide a mixed remainder part for feeding onto the downstream spiral trough part;

a concentrate channel for offtake of the concentrate part; and a semi-concentrate bypass channel for conveying the semi-concentrate part towards the downstream spiral trough part, such that the semi-concentrate component bypasses and is segregated from the mixing region;

wherein the concentrate channel and the semi-concentrate channel are both, at least partially, radially inward of the mixing region;

wherein the apparatus provides a semi-concentrate outlet configured to direct said semi-concentrate part from the bypass channel to an inner region of a working trough floor surface of the downstream spiral trough to which more dense particles migrate, in use, across the working trough floor surface, from an outer region of the working trough floor surface, at an upstream part of the downstream spiral trough part; and wherein the apparatus provides a mixed remainder outlet configured to direct said mixed remainder part from the mixing region to the outer region of the downstream spiral trough part, at an upstream part of the downstream spiral trough part.

16. A method of concentrating a more dense mineral provided in a mineral slurry comprising the more dense mineral and water, the method comprising:

using an upstream stage of a spiral separator to concentrate the more dense mineral towards a radially inner side of a spiral trough of the upstream stage, splitting the mineral slurry, at or adjacent a bottom region of the upstream stage, into a radially inner concentrate part, a radially intermediate semi-concentrate part and a radially outer remainder part, wherein the concentrate part comprises a higher concentration of the more dense mineral than the semi-concentrate part, and the semi-concentrate part comprises a higher concentration of the more dense mineral than the remainder part;

segregating the semi-concentrate part from the remainder part;

mixing a more fluid radially more outward part of the remainder part with a less fluid radially more inward part of the remainder part, in a mixing region of the spiral separator to thereby provide a mixed remainder part, wherein the semi-concentrate part is segregated from the mixing region; and feeding the mixed remainder part and the semi concentrate part onto a downstream stage of the spiral separator, the downstream stage having a trough floor configured such that in use more dense mineral particles migrate inwardly from an outer region, across the trough floor, to concentrate at an inner region thereof, wherein the semi-concentrate part is fed to the inner region of the downstream stage at an upstream part of the downstream stage; and the mixed remainder part is fed to the outer region of the downstream stage at an upstream part of the downstream stage.

* * * * *